United States Patent
Dolinar et al.

(10) Patent No.: US 9,298,991 B2
(45) Date of Patent: Mar. 29, 2016

(54) GPS-BASED MACHINE VISION ROADWAY MARK LOCATOR, INSPECTION APPARATUS, AND MARKER

(71) Applicant: LimnTech LLC, Souderton, PA (US)

(72) Inventors: Douglas D. Dolinar, Doylestown, PA (US); William R. Haller, Bethlehem, PA (US)

(73) Assignee: LimnTech LLC, Souderton, PA (US)

( * ) Notice: Subject to any disclaimer, the term of this patent is extended or adjusted under 35 U.S.C. 154(b) by 0 days.

(21) Appl. No.: 13/728,062

(22) Filed: Dec. 27, 2012

(65) Prior Publication Data

US 2013/0184938 A1 Jul. 18, 2013

Related U.S. Application Data

(63) Continuation-in-part of application No. 13/351,829, filed on Jan. 17, 2012, now Pat. No. 8,467,968.

(51) Int. Cl.
*B62D 6/00* (2006.01)
*B62D 11/00* (2006.01)
(Continued)

(52) U.S. Cl.
CPC ............ *G06K 9/00791* (2013.01); *E01C 23/22* (2013.01); *F16M 13/022* (2013.01); *G01C 15/02* (2013.01); *B62D 5/0463* (2013.01)

(58) Field of Classification Search
USPC ......... 701/117, 23, 28, 468, 469, 534, 439, 4, 701/46, 448, 53, 3, 41; 340/435, 436; 404/93; 427/136, 137, 427.2
See application file for complete search history.

(56) References Cited

U.S. PATENT DOCUMENTS 4,219,092 A 8/1980 Richter
4,460,127 A 7/1984 Hofmann
(Continued)

FOREIGN PATENT DOCUMENTS

CN 203047061 U * 7/2013 ............... B60Q 9/00
DE 102005044977 A1 * 3/2007 ......... G06K 9/00798
(Continued)

OTHER PUBLICATIONS

Supporting Drivers in Keeping Safe Speed and Safe Distance: The SASPENCE Subproject Within the European Framework Programme 6 Integrating Project PReVENT;Bertolazzi, E. et al.. ;Intelligent Transportation Systems, IEEE Trans. on;vol. 11 , Issue: 3; Digital Object Id: 10.1109/TITS.2009.2035925; Pub. Yr: 2010 , pp. 525-538.*

(Continued)

*Primary Examiner* — Cuong H Nguyen
(74) *Attorney, Agent, or Firm* — Stradley Ronon Stevens & Young, LLP

(57) ABSTRACT

An apparatus for locating, inspecting, or placing marks on a roadway. The apparatus includes a GPS-based machine vision locator for sampling discrete geographical location data of a pre-existing roadway mark evident on the roadway. A computer may determine a continuous smooth geographical location function fitted to the sampled geographical location data. And a marker is responsive to the GPS-based locator and geographical location function for replicating automatically the pre-existing roadway mark onto the roadway. The apparatus is typically part of a moving vehicle. A related method is disclosed for locating, inspecting, and placing marks on a resurfaced roadway. A similar apparatus can be used to guide a vehicle having a snow plow along a snow-covered roadway, or a paving machine along an unpaved roadway surface.

37 Claims, 14 Drawing Sheets

(51) Int. Cl.
| | |
|---|---|
| *G06K 9/00* | (2006.01) |
| *E01C 23/22* | (2006.01) |
| *F16M 13/02* | (2006.01) |
| *G01C 15/02* | (2006.01) |
| *B62D 5/04* | (2006.01) |

(56) References Cited

U.S. PATENT DOCUMENTS

| | | | | |
|---|---|---|---|---|
| 4,832,331 | A | | 5/1989 | Brandli |
| 5,220,876 | A | | 6/1993 | Monson et al. |
| 5,296,256 | A | | 3/1994 | Hartman |
| 5,375,059 | A | | 12/1994 | Kyrtsos et al. |
| 5,529,433 | A | | 6/1996 | Huynh et al. |
| 5,540,516 | A | | 7/1996 | Nicodemo et al. |
| 5,549,412 | A | | 8/1996 | Malone |
| 5,599,133 | A | * | 2/1997 | Costello et al. ........... 404/72 |
| 5,653,389 | A | | 8/1997 | Henderson et al. |
| 5,746,539 | A | | 5/1998 | Mara |
| 5,771,169 | A | | 6/1998 | Wendte |
| 5,836,398 | A | | 11/1998 | White |
| 5,838,277 | A | | 11/1998 | Loomis et al. |
| 5,848,373 | A | | 12/1998 | DeLorme et al. |
| 5,857,066 | A | | 1/1999 | Wyche et al. |
| 5,990,469 | A | * | 11/1999 | Bechtel ............ B60Q 1/1423 |
| | | | | 250/208.1 |
| 5,995,902 | A | | 11/1999 | Monson |
| 6,074,693 | A | | 6/2000 | Manning |
| 6,115,481 | A | | 9/2000 | Wiens |
| 6,299,934 | B1 | * | 10/2001 | Manning ..................... 427/137 |
| 6,330,503 | B1 | | 12/2001 | Sharp et al. |
| 6,723,375 | B2 | | 4/2004 | Zeck et al. |
| 6,729,706 | B1 | | 5/2004 | Patton et al. |
| 6,951,375 | B2 | | 10/2005 | Patton et al. |
| 7,029,199 | B2 | | 4/2006 | Mayfield et al. |
| 7,370,818 | B2 | | 5/2008 | Ward et al. |
| 7,552,008 | B2 | | 6/2009 | Newstrom et al. |
| 7,640,105 | B2 | | 12/2009 | Nielsen et al. |
| 7,698,032 | B2 | * | 4/2010 | Matsumoto et al. ........... 701/36 |
| 7,832,762 | B2 | | 11/2010 | Breed |
| 7,866,917 | B2 | | 1/2011 | Malit |
| 7,899,611 | B2 | | 3/2011 | Downs et al. |
| 7,970,529 | B2 | * | 6/2011 | Mori et al. .................... 701/117 |
| 7,981,462 | B2 | | 7/2011 | Bustgens |
| 8,190,362 | B2 | | 5/2012 | Barker et al. |
| 8,935,057 | B2 | | 1/2015 | Dolinar et al. |
| 9,098,751 | B2 | * | 8/2015 | Hilldore ............ G06K 9/00798 |
| 2002/0040962 | A1 | * | 4/2002 | Schofield ............ B60N 2/002 |
| | | | | 250/208.1 |
| 2002/0044087 | A1 | | 4/2002 | Krasner |
| 2003/0058346 | A1 | * | 3/2003 | Bechtel ............ B60Q 1/1423 |
| | | | | 348/207.99 |
| 2003/0139879 | A1 | | 7/2003 | Krasner |
| 2004/0124260 | A1 | | 7/2004 | Ward et al. |
| 2006/0215882 | A1 | * | 9/2006 | Ando ............... G06K 9/00791 |
| | | | | 382/106 |
| 2007/0128899 | A1 | | 6/2007 | Mayer |
| 2007/0208497 | A1 | | 9/2007 | Downs et al. |
| 2008/0046174 | A1 | | 2/2008 | Johnson |
| 2008/0203187 | A1 | | 8/2008 | Ward et al. |
| 2009/0118994 | A1 | * | 5/2009 | Mori et al. .................... 701/117 |
| 2010/0104199 | A1 | * | 4/2010 | Zhang et al. ................... 382/199 |
| 2010/0185382 | A1 | | 7/2010 | Barker et al. |
| 2010/0256912 | A1 | | 10/2010 | Nielsen et al. |
| 2010/0257029 | A1 | | 10/2010 | Nielson et al. |
| 2010/0259609 | A1 | * | 10/2010 | Takahashi ..................... 348/135 |
| 2010/0262470 | A1 | | 10/2010 | Nielsen et al. |
| 2010/0263591 | A1 | | 10/2010 | Nielsen et al. |
| 2010/0295668 | A1 | * | 11/2010 | Kataoka ........................ 340/435 |
| 2011/0039021 | A1 | | 2/2011 | Persson et al. |
| 2011/0285849 | A1 | * | 11/2011 | Schofield ............ G05D 1/0244 |
| | | | | 348/148 |
| 2012/0054028 | A1 | | 3/2012 | Tengler et al. |
| 2012/0072080 | A1 | * | 3/2012 | Jeromin et al. ................. 701/49 |
| 2012/0098657 | A1 | | 4/2012 | Bogatine |
| 2015/0127223 | A1 | | 5/2015 | Dolinar et al. |

FOREIGN PATENT DOCUMENTS

| | | | | |
|---|---|---|---|---|
| JP | 02007316767 A | * | 12/2007 | ............ G06T 7/60 |
| JP | 2009223220 | | 10/2009 | |
| JP | 2009223817 | | 10/2009 | |
| JP | 2009258651 | | 11/2009 | |
| JP | 2009259215 | | 11/2009 | |
| JP | 2010175756 | | 8/2010 | |

OTHER PUBLICATIONS

GPS Multipath Mitigation for Urban Area Using Omnidirectional Infrared Camera; Meguro, J. ; Murata, T. ; Takiguchi, J. ; Amano, Y. ; Hashizume, T. ;Intelligent Transportation Systems, IEEE Transactions on; Volume: 10 , Issue: 1; Digital Object Identifier: 10.1109/TITS.2008.2011688; Publication Year: 2009 , pp. 22-30.*
Lane detection with roadside structure using on-board monocular camera; Watanabe, A. ; Naito, T. ; Ninomiya, Y. Intelligent Vehicles Symposium, 2009 IEEE ; Digital Object Identifier: 10.1109/IVS.2009.5164276 Publication Year: 2009 , pp. 191-196.*
A comparative study of location aided routing protocols for MANET; Hnatyshin, V.; Ahmed, M.; Cocco, R.; Urbano, D.; Wireless Days (WD), 2011 IFIP; Digital Object Identifier: 10.1109/WD.2011.6098169 ; Publication Year: 2011 , pp. 1-3.*
Implementation of GPS for location tracking; Ariffin, A.A.B.; Aziz, N.H.A.; Othman, K.A.; Control and System Graduate Research Colloquium (ICSGRC), 2011 IEEE; Digital Object Identifier: 10.1109.ICSGRC.2011.5991833; Publication Year: 2011 ,pp. 77-81.*
A study of precise road feature localization using mobile mapping system; Ishikawa, K. ; Amano, Y. ; Hashizume, T. ; Takiguchi, J. Advanced intelligent mechatronics, 2007 IEEE/ASME international conference on; DOI: 10.1109/AIM.2007.4412541 Publication Year: 2007 , pp. 1-6.*
GeoLANMAR: geo assisted landmark routing for scalable, group motion wireless ad hoc networks; Zhou, B.; De Rango, F.; Gerla, M.; Marano, S.; Vehicular Technology Conference, 2005. VTC 2005-Spring. 2005 IEEE 61st ; vol. 4; Digital Object Identifier: 10.1109/VETECS.2005.1543769; Publication Year: 2005 , pp. 2420-2424 vol. 4.*
Map-based lane identification and prediction for autonomous vehicles; Martinez, Leonardo ; Paulik, Mark ; Krishnan, Mohan ; Zeino, Eyad; Electro/Information Technology (EIT), 2014 IEEE International Conference on; DOI: 10.1109/EIT.2014.6871806 Publication Year: 2014 , pp. 448-453.*
Lane detection with roadside structure using on-board monocular camera; Watanabe, A.; Naito, T.; Ninomiya, Y.; Intelligent Vehicles Symposium, 2009 IEEE; Digital Object Indentifier: 10.1109/IVS.2009.5164276; Publication Year 2009; pp. 191-196.*
Stop-line detection and localization method for intersection scenarios; Marita, T. ; Negru, M. ; Danescu, R. ; Nedevschi, S. Intelligent Computer Communication and Processing (ICCP), 2011 IEEE International Conference on; DOI: 10.1109/ICCP.2011.6047883; Publication Year: 2011 , pp. 293-298.*
Mapping and localization using GPS, lane markings and proprioceptive sensors; Tao, Z. ; Bonnifait, P. ; Fremont, V. ; Ibanez-Guzman, J.; Intelligent Robots and Systems (IROS), 2013 IEEE/RSJ International Conference on; DOI: 1109/IROS.2013.6696383; Publication Year: 2013 , pp. 406-412.*
International Search Report issued May 9, 2013 for international application No. PCT/US2013/021684.
Performance analysis of a shipborne gyrocompass with a multi-antenna GPS system; Lu, G.; Lachapelle, G.; Cannon, M.E.; Vogel, B.; Position Location and Navigation Symposium, 1994., IEEE; Digital Object Identifier: 10.1109/PLANS, 1994.303334; Publication Year: 1994, pp. 337-343.
A Comparative Study of Location Aided Routing Protocols for MANET; Hnatyshin, V. et al.; Wireless Days (WD) 2011 IFIP, Digital Object Identifier; Publication Year 2011; pp. 1-3.
GeoLANMAR; Geo Assisted Landmark Routing for Scalable, Troup Motion Wireless Ad Hoc Networks; Zhou B. et al.; Vehicular Technology Conference 2005; 2005 IEEE 61st; vol. 4; Digital Object Identifier; Publication Year 2005; pp. 2420-2424 vol. 4.

(56) References Cited

OTHER PUBLICATIONS

Implementation of GPS for Location Tracking; Ariffin et al.; Control and System Graduate Research Colloquium (ICSGRC), 2011 IEEE; Digital Object Identifier; 10.1109/ICSGRC.2011.5991833; Publication Year 2011: pp. 77-81.

Click4BuildingID@NTU: Click for Building Identification with GPS-enabled Camera Cell Phone; Chai Kiat Yeo; Liang-Tien Chia; Tat Jen Cham; Rajon, D.; Multimedia and Expo, 2007 IEEE International Conference on; Digital Object Identifier: 10.1109/ICME.2007.4284836; Publication Year: 2007, pp. 1059-1062.

Light-weight localization for vehicles using road markings; Ranganathan, A.; Illstrup.D.; Tao Wu; 2013 IEEE/RSJ International Conference on Intelligent Robots and Systems (IROS), Nov. 3-7, 2013, Tokyo, Japan; Publication Year 2013; pp. 921-927.

Map-based Lane Identification and Prediction for Autonomous Vehicles; Leonardo et al.; Electro/Information Technology (EIT), 2014 IEEE International Conference; Publication Year 2014; pp. 448-453.

Mapping and localization using GPS, lane markings and proprioceptive sensors; Tao et al.; 2013 IEEE/RSJ International Conference on Intelligent Robots and Systems (IROS); Publication Year 2013; pp. 406-412.

Stop-line Detection and Localization Method for Intersection Scenarios; Marita et al.; Intelligent Computer Communication and Processing (ICCP), 2011 IEEE International Conference; Publication Year 2011; pp. 293-298.

Notice of Allowance dated Sep. 3, 2014 for U.S. Appl. No. 13/741,573.

Intelligent Vehicle Localization Using GPS, Compass, and Machine Vision; Limsoonthrakul, S.; Dailey, M.N.; Parnichkun, M.; Intelligent Robots and Systems, 2009; IROS 2009; IEEE/RSJ International Conference on; DOI: 10.1109/IROS.2009.5354042; Publication Year 2009; pp. 3981-3986.

Localization Algorithms for Distributed Platform Among Vehicles; Tsuchiya, T.; Yoshinaga, H.; Lihan, M.; Koyanagi, K.; Ultra Modern Telecommunications & Workshops, 2009; ICUMT '09; International Conference on; DOI: 10.1109/ICUMT.2009.5345615; Publication Year 2009; pp. 1-6.

Online Road Segmentation for Urban Complex Environments; Suzuki, M.; Saitoh, T.; Terada E.; Kuroda, Y.; Communications and Information Technologies (ISCIT), 2010 International Symposium on; DOI: 10.1109/ISCIT.2010.5665142; Publication Year 2010, pp. 1039-1044.

Segmentation of Dense Range Information in Complex Urban Scenes; Schoenberg, J.R.; Nathan A.; Campbell, M.; Intelligent Robots and Systems (IROS); 2010 IEEE/RSJ International Conference on; DOI: 10.1109/IROS2010.5651749; Publication Year 2010; pp. 2033-2038.

* cited by examiner

GPS-BASED MACHINE VISION ROADWAY MARK LOCATOR, INSPECTION APPARATUS, AND MARKER

CROSS REFERENCE TO RELATED APPLICATIONS

This application is a continuation-in-part of U.S. patent application Ser. No. 13/351,829, filed on Jan. 17, 2012, which is incorporated by reference into this document, in its entirety and for all purposes.

TECHNICAL FIELD

The present invention relates generally to GPS-based machine vision locating and inspection systems and to devices for making a visual indicia in or on top of pavement. More particularly, the present invention relates to vehicle mounted locating and inspection systems for determining the geographical location and condition of roadway marks, and GPS-based systems used for painting or otherwise "marking" roadway traffic lane demarcation lines.

BACKGROUND OF THE INVENTION

New or repaved roadway surfaces almost always require the application of roadway surface markings as a mechanism for visually providing motorists with lane demarcation lines for controlling and directing traffic. In the past, the process of applying new roadway surface markings consisted of first manually determining the center of the roadway surface and painting small dots to visually define the roadway center. A driver of a paint vehicle would then use the roadway center to guide a paint sprayer which would deposit paint along the path defined by the small dots.

Currently, this task is accomplished by determining the center of the roadway at a first location point by manually measuring the width of the roadway and placing a mark at the center point. This process is then repeated to determine the center point of the roadway at a second point which is displaced from the first point. These two points now define the starting and ending points for a line segment which identifies the center path of the roadway. A chain or string line is then stretched between the first and second center points and small white (or other colored) painted dots are manually sprayed and spaced along the stretched chain giving a visual indication of the center line of the roadway. The chain or string line is then removed from the roadway surface. This entire process is then repeated for the next segment of the roadway using the ending position of the first segment as the starting position for the second segment. This process is continuously repeated until the location of the center of the entire roadway has been defined. The roadway center line is used as a reference to define the roadway mark path (i.e., the roadway center line defines the mark path).

Having defined the position of the center of the roadway, a truck equipped with line painting equipment is positioned over the white dots. The driver of the truck then uses the white dots as a visual guide along with a pointer for coarsely positioning the truck over the defined segments. A second operator sits at the rear of the truck and positions a side moveable paint carriage directly over the dots for all defined segments of the roadway center. The side moveable carriage allows the second operator to apply the roadway marking at the desired location and to correct for any slight misalignment of the truck position with respect to the guide dots. A controlled paint spray nozzle array positioned on the side moveable carriage then applies the paint onto the roadway surface as the truck follows each center segment of the roadway. As the truck follows the mark path (the center of the roadway), the nozzle array applies the desired roadway mark (a single or multiple, solid or dashed, roadway marking) which may be offset from the mark path.

Although the current technology achieves the desired goal of providing a system for applying roadway markings, the current system is manually intensive and places the personal safety of workers at significant risk. For example, two workers are required to measure the starting and ending position of the segments, and two workers are required to actually paint the roadway markings (one worker is required to drive the truck and the other worker is required to operate both the carriage and paint dispensing equipment). In addition, to minimize the impact of applying the roadway surface markings to actively traveled roads and highways, the application of roadway markings is usually done in the late evening hours. During this time, traffic visibility is impeded and there is a significant potential for oncoming traffic to collide with those workers manually defining the starting and ending positions for each segment.

Previous attempts to automate the process of marking roadways included guiding the road marking equipment along a predetermined mark path using electromagnetic beams. Unfortunately, these methods required the placement of transmitters along the roadway. Other previous attempts have included the use of light beams arranged in a manner to define the proper path. Again, this attempt proved difficult to implement because of sunlight interference. Other attempts have included using radioactive marking material which would emit a characteristic fingerprint to define the roadway mark path. There are many disadvantages with using radioactive marking material, including health and safety issues, longevity (half-life) of the radioactive material, and disposal problems.

Other attempts to re-mark roadway surfaces have included using a drawing application program in combination with a global positioning system (GPS)-based paint sprayer. A drawing pattern is created using the application program and geographical coordinates for the pattern which are manually defined and then used by the GPS paint sprayer to mark the roadway surface. This attempt requires that the drawing pattern for the roadway be predetermined and fails if the exact location of the roadway marking is inaccurately defined, or if the drawing pattern does not correspond exactly with the geographical position of the actual roadway.

U.S. Pat. Nos. 6,074,693 and 6,299,934 (related as a divisional) each disclose one example of a paint sprayer for marking roadways and fields with a drawing pattern. Both issued to Manning and titled "Global Positioning System Controlled Paint Sprayer," the patents teach a system having an external computer and a GPS paint sprayer. The drawing pattern is created by a designer using either a geographical information system (GIS) which runs, or drawing application programs which run, on the external computer. A print file of the drawing pattern is created by the operating system software and is passed to the GPS paint sprayer. The print file may contain the geographical mapping of pixel data; instead, the geographical mapping of the pixel data may be completed within the GPS paint sprayer. In either case, the geographical mapping of the drawing image is determined and then stored in memory within the GPS paint sprayer. The GPS paint sprayer further includes a GPS receiver and a location comparator. The GPS receiver determines the geographical location of the GPS paint sprayer and the location comparator determines if a match occurs between the current GPS location of the paint sprayer and the geographical mapping of the drawing image. If a location match between the current GPS location of the GPS paint sprayer and geographical mapping data of the drawing image is detected, a control signal is sent to a spray nozzle which deposits paint or other material at the match location. Both lines and picture-like drawings can be marked onto a surface using this patented system.

The '934 patent issued to Manning refers to fifteen earlier patents. Each patent is briefly summarized as follows. First, U.S. Pat. No. 4,219,092, titled "Automatic Guidance Apparatus" and issued to Richter, discloses an apparatus for automatically guiding a moving object such as a vehicle along a predetermined path. The predetermined path is defined by a stripe of material capable of emitting a secondary X-ray wave excited by a first X-ray emitted from the vehicle. Two detectors, a comparison mechanism, and a servo mechanism mounted within the vehicle correct the vehicle's path and maintain the vehicle on the desired path.

U.S. Pat. No. 4,460,127, titled "Device for Applying Uniform Traffic Lines" and issued to Hofmann, discloses a device operable from a moving vehicle for uniformly applying traffic marks by preventing the occurrence of substantial pressure fluctuations during the opening and closing of the paint nozzle. U.S. Pat. No. 4,832,331, titled "Athletic Field Marker" and issued to Brandli, discloses a resilient marker strip which is imbedded into a sports playing field. The top portion of the strip is exposed and visible for marking boundary lines. U.S. Pat. No. 5,220,876, titled "Variable Rate Application System" and issued to Monson et al., teaches a fertilizer blending and dispensing apparatus and method for fertilizing agricultural fields based upon field location and soil type, desired soil fertilizer content, current soil fertilizer status, and vehicle speed. A GPS or other vehicle location mechanism is incorporated into the apparatus.

U.S. Pat. No. 5,296,256, titled "Method and Apparatus for Painting Highway Markings" and issued to Hartman, discloses a method and apparatus for painting traffic marking lines over old paint markings on road pavement. Normally installed on a marking vehicle having a paint gun and a paint supply, the apparatus includes a detector which illuminates the pavement and utilizes a spectroscope to analyze the return inspection for the presence of one or more known preselected constituents of the old paint marking to control actuation of the valve on the paint gun and also track the old pavement marking. The apparatus also provides a paint gun delay function to account for the lead distance between the detector and paint gun and enables the application of new paint markings directly over the old markings at a relatively high rate of vehicle speed.

U.S. Pat. No. 5,529,433, titled "Apparatus and Method for Marking a Surface" and issued to Huynh et al., teaches an apparatus and method for dispensing material to mark a predetermined pattern onto a surface. The dispenser is manipulated in the x, y, and z directions. In addition, the dispenser can rotate and form a tilt angle with a w-axis.

U.S. Pat. No. 5,540,516, titled "Method for Marking Grass Fields and Apparatus for Applying Such Method" and issued to Nicodemo et al., teaches an apparatus and method for marking sports fields by bending grass blades in different directions. The location of the apparatus can be determined by using GPS or transceivers.

U.S. Pat. No. 5,549,412, titled "Position Referencing, Measuring and Paving Method and Apparatus for a Profiler and Paver" and issued to Malone, discloses a road working apparatus for determining the levelness of a road surface (surface profile) as a function of position and a leveler for forming a substantially level mat of material on a base surface of a road.

U.S. Pat. No. 5,653,389, titled "Independent Flow Rate and Droplet Size Control System and Method for Sprayer" and issued to Henderson et al., teaches a flow rate and droplet size control system for spraying a liquid (agricultural fertilizer) onto a surface. A position-responsive control system receives information pertaining to the boundaries of spray zones and spray conditions. The position of the sprayer may be determined by a GPS system.

U.S. Pat. No. 5,746,539, titled "Rapid Road Repair Vehicle" and issued to Mara, discloses a rapid road repair vehicle for quickly repairing a road surface and recording the position and time of the repair. A GPS system is used to determine the location of the repair.

U.S. Pat. No. 5,771,169, titled "Site-Specific Harvest Statistics Analyzer" and issued to Wendt, discloses both an apparatus and method for allowing a farmer to analyze site-specific data for optimizing crop yield as a function of any number of inputs. Geo-referenced maps along with data representative of a spatially variable characteristic are used to analyze statistical data for at least one given region of a farming field. A GPS-based location system may be used to define regions of interest for the analysis.

U.S. Pat. No. 5,836,398, titled "Vehicle Mounted Fire Fighting System" and issued to White, discloses a vehicle for fighting fires which may have a GPS/GIS system to determine the location of the vehicle relative to the proximity of a fire and other surroundings.

U.S. Pat. No. 5,838,277, titled "GPS-Based Controller Module" and issued to Van Wyck Loomis, discloses a zone-based GPS controller module. The apparatus includes a GPS receiver, a zoned map, and controller logic. The GPS location is used to determine a particular zone location. In response to a particular zone location, the controller produces analog or logic signal outputs.

U.S. Pat. No. 5,857,066, titled "Method and System for Producing an Improved Hiking Trail Map" and issued to Wyche et al., discloses a method for producing a hiking trail map using a GPS receiver for determining the positions at the beginning and end of each approximately linear trail segment.

U.S. Pat. No. 6,115,481, titled "User Modifiable Land Management Zones for the Variable Application of Substances Thereto" and issued to Wiens, discloses an apparatus and method for applying one or more formulations of substances (such as fertilizers, pesticides, and the like) to farmland, forest, and other areas based upon the specific geographical location (i.e., a particular zone within the land area). A GPS system may be used for graphically tracking a representation of a vehicle traversing the land area for determining the particular zone and formulations for that zone.

The following seven patents reference the Manning patents. Each is briefly identified as follows. First, U.S. Pat. No. 6,723,375, titled "Portable Locator Including a Ground Marking Arrangement" and issued to Zeck et al., discloses a method for locating an underground cable and marking the surface above the buried cable.

U.S. Pat. No. 6,729,706, titled "Large Area Marking Device and Method for Printing" and issued to Patton et al., discloses an apparatus and method for printing an image over a large surface area such as driveways, fields, and decks or patios. U.S. Pat. No. 6,951,375, titled "Large Area Marking Device and Method for Printing" and issued to Patton et al., discloses a method and apparatus for printing an enhanced image on a large surface area using a scanned approximation (crude image) of the desired image. These two patents specifically refer to the '693 patent and characterize GPS systems as lacking the accuracy for printing an image.

U.S. Pat. No. 7,029,199, titled "Automatic Ground Marking Method and Apparatus" and issued to Mayfield et al., discloses an apparatus for marking an even or uneven surface with complex patterns or logos. A GPS-based guidance system may be used for determining the location of the marker apparatus.

U.S. Pat. No. 7,640,105, titled "Marking System and Method with Location and/or Time Tracking" and issued to Nielsen et al., discloses an apparatus and method for marking ground or pavement to provide a visual indication of a buried utility. A GPS-based system is used to record the geographical location of marks placed on the surface. The time that the mark was made may also be recorded.

U.S. Pat. No. 7,866,917, titled "Trailing System for Dispensing Paint" and issued to Malit, teaches a device and method for marking roadways. The device has a mechanism for uniquely identifying the road which may include selectively visible paint. The paint (or other marks) are used to compliment a computer-assisted transportation system and other applications.

U.S. Pat. No. 7,981,462, titled "Method for Applying Paints and Varnishes" and issued to Bustgens, teaches a method for applying paint to buildings and other objects while avoiding protrusions, balconies, and the like which may be incorporated into the desired surface, according to an image template.

The current roadway marking technology has several problems. One problem is that a significant amount of manual labor is required to accurately paint lines on roadways, and as a result workers are placed in an unsafe working environment during the roadway marking process. Another problem with current technology is the inability to easily and quickly obtain sampled geographical coordinates of the existing roadway line marks using GPS or GPS-based pseudolite arrays. A related problem is the inability to use this sampled data to generate a continuous function of the geographical coordinates for the entire mark path. Additional problems are the lack of an offsetting capability to determine other substantially parallel mark paths for line marking and, therefore, the inability to uniformly deposit paint or other material along the first (or second) mark path duplicating the previous mark.

The '693 patent expressly notes certain disadvantages with the current roadway marking technology. Under the heading "Description of the Prior Art," as column 1, lines 11-40, the '693 patent states: "Road markings are produced to a great extent with the assistance of so called 'road marking' machines which apply paint under pressure from spray nozzle jets onto the road surface. In marking the road it is quite important that the horizontal registration of the paint be accurate with respect to the position of the road. In the past even experienced machine operators have found it difficult to manually guide a road marking machine with sufficient accuracy even where old markings are available. Heretofore, attempts have been made to automatically detect the presence of old markings and to use their detection for automatically guiding the road marking machine and switching the spray nozzle on and off as required. However, such attempts have not been wholly satisfactory because a break in the old marking does not give steering guidance during breaks. Moreover, this approach is of no use whatsoever where the old marks have disappeared or for new markings. Various arrangements have been disclosed for solving these problems by automatically guiding the road marking machine along a pre-determined path using light or electromagnetic beams. However, these arrangements require transmitters to be placed along the road, and in the case of light beams, are degraded by the effect of sunlight. In order to overcome these problems, it has been proposed to embed material [that] emitting radiation in the path that is to be marked. However, this method suffers from the disadvantage that embedding the radiating material in the road surface can be costly. Furthermore, radiating materials tend to lose their effectiveness after a time period. Similar issues pertain to parking lots, air landing fields, and the like."

Although Manning identifies certain disadvantages with the known roadway marking technology, the GPS-controlled paint spray system disclosed by Manning in the '693 and '934 patents has its own disadvantages. First, a designer must generate a drawing and it must be assumed that the designer has accurately generated the drawing pattern. It must be further assumed that the actual constructed road matches the content of the drawing pattern. And the system fails if a discrepancy exists between the actual and drawing pattern road position.

In addition, the disclosed system cannot maintain the accurate horizontal registration of the paint markings which is required when the drawing pattern does not accurately match the actual constructed roadway. This situation occurs where on-site construction changes are prompted by unforeseen construction problems. Such problems include, for example, bedrock formations, unstable ground structure, water runoff, and the like.

The designer using the system disclosed by Manning must determine and enter data corresponding to the reference geographical location for the center of the drawing, scaling information, orientation information, and other aspect ratio information to accurately determine the marking size and orientation. Thus, the system may require registration, orientation, and size input. The designer also must enter data manually for road markings, such as end points for a line, or an equation using known geographical location coordinates. This includes known coordinates from a previous survey. The system assumes that the designer can accurately determine geographical mark locations.

For an arc, the designer must select the end points and a radius. Such selection does not allow for a smoothly constructed functional fit. The designer must manually join line segments used to make a relatively long continuous painted line. The track line, which is a line, is produced from individual points and is not a smoothly derived curve from a mathematically derived function.

The system disclosed by Manning relies on an available equation. It does not sample pre-existing roadway marks (or produce a set of spaced points). The system does not record cross track position relative to a GPS receiver. The '693 patent does not disclose any mechanism for producing a curved line. Finally, the system disclosed by Manning paints only when there is a location match between the current GPS-based location and one of the data points in the geographical mark location data.

Others have attempted to use a combination of video-grammetry (imagers) and navigation tools (GPS systems for example) to map roadway features including roadway marks. For example, a study of precise road feature localization using a mobile mapping system has been completed. To determine the location of a roadway mark, however, an operator must manually select the feature position (i.e., roadway mark) on the camera's u-v coordinates using a manual digitizing tool. The conventionally defined east, north, up (ENU) coordinates of the manually selected feature are then determined by the mobile mapping system.

This system is prone to positional inaccuracies of the operator and is not completely automated. Individual selection of each roadway mark is time consuming and dependent upon the skill and experience of the operator. Furthermore, no mechanism is provided to automatically inspect the roadway marks for reflectivity and contrast; length and width dimensions; mark fill percentage; and other important quality standards.

Thus, there is a need in the industry for a roadway surface marking system that requires less manual labor, increases the operational safety factor for workers, and is less expensive than the current roadway marking technology, and which will accurately and uniformly mark roadway repaved surfaces.

BRIEF SUMMARY OF THE INVENTION

To meet the needs identified above and others which will be apparent from a review of the current technology, and in view of its purposes, the present invention provides GPS-based systems used for painting or otherwise "marking" roadway traffic lane demarcation lines and vehicle mounted locating and inspection systems for determining the geographical location and condition of roadway marks.

To overcome the shortcomings of current roadway marking technology, a new apparatus and method for placing marks on a resurfaced (or repaved) roadway are provided. A basic object of the present invention is to provide an improved apparatus for automatically marking repaved roadways. A related object is to sample the geographical position of a pre-existing roadway mark path. A further related object is to sample the geographical position of a pre-existing roadway mark path using a GPS or GPS-based pseudolite array system.

It is another object of the invention to determine a continuous mark path based upon the sampled geographical mark path. It is still another object of the present invention to quickly determine the pre-existing roadway mark characteristics, pattern, and geographical position. An additional object is to accurately deposit paint or other marking material onto a repaved roadway replicating the pre-existing mark at locations determined by the continuous mark path.

Yet another object of the invention is to automatically create a second continuous roadway mark path substantially parallel to the original mark path. It is a further object of the invention to accurately deposit paint or other marking material onto a repaved roadway at the location determined by the second continuous roadway mark path. It is yet another object of the invention to provide a system for guiding the driver of the roadway marking vehicle. A related object is to dispense an even and consistent paint mark irrespective of vehicle speed. The invention has as another object automatically guiding the paint vehicle along the mark path based upon a mark path continuous function.

The present invention also provides an apparatus and method for automatically determining the geographical location of a pre-existing roadway mark. The present invention provides for an apparatus and method for automatically determining the geographical location of a pre-existing roadway mark from a moving vehicle. For example, the geographical location of a pre-existing roadway mark may be determined from an image of the mark. It is another object of the invention to determine the GPS geographical location of a pre-existing mark from an image of the mark. It is yet another object of the invention to sample the geographical location of a roadway mark.

The present invention provides for an apparatus and method to image roadway marks from a moving vehicle. It is another object of the invention to image roadway marks to the left and to the right sides of a moving vehicle. It is still yet another object of the invention to image roadway lane demarcation marks from a moving vehicle travelling within the lane. One or more imagers may be mounted onto the side of the moving vehicle to image roadway marks. It is another object of the invention to provide for a rotational mount for affixing the imager to the side of the vehicle. It is another object of the invention to provide for a removable rotational mount which is quickly and easily affixed to, and removed from, the side of a vehicle.

Another object of the invention is to accurately synchronize mark images with their respective GPS geographical locations. Additional objects of the invention are to automatically determine the quality of roadway marks and to automatically compare the actual image of a roadway mark with a standard image of the roadway mark. A related object of the invention is to automatically determine the length and width of roadway marks and the relative spacing between consecutive roadway marks from the roadway mark images. A further object of the invention is to determine the area of the roadway mark. For example, the apparatus and method may automatically determine the area fill percentage of a roadway mark. A still further object of the invention is to automatically determine the reflective contrast between the roadway surface and the roadway mark. Yet another object of the invention is to automatically determine the geographical position of roadway marks which do not meet the acceptable standards. The invention has as an object to provide for an imaging system to image roadway marks during low ambient light conditions.

The invention further provides an apparatus for placing marks on a resurfaced roadway. The apparatus includes a GPS-based locator for sampling discrete geographical location data of a pre-existing roadway mark evident on the roadway before resurfacing. A computer determines a continuous smooth geographical location function fitted to the sampled geographical location data. And a marker is responsive to the GPS-based locator and geographical location function for replicating automatically the pre-existing roadway mark onto the resurfaced roadway. The apparatus is typically part of a moving vehicle. A related method is disclosed for placing marks on a resurfaced roadway. A similar apparatus can be used to guide a vehicle having a snow plow, paver, or other similar equipment along a roadway.

Other objects and advantages of the present invention will become more clear following a review of the specification and drawings. It is to be understood that both the foregoing general description and the following detailed description are exemplary, but are not restrictive, of the invention.

BRIEF DESCRIPTION OF THE DRAWING

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 9b is a side view of the adjustable imager mount shown in FIG. 9a;

DETAILED DESCRIPTION OF THE INVENTION

Figure 1:
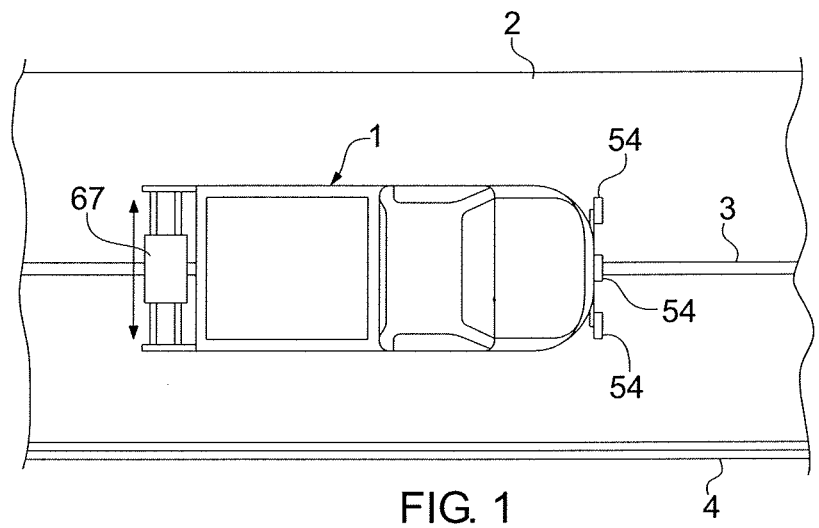
FIG. 1 is a diagrammatic plan view of a vehicle fitted with the apparatus according to the present invention and moving along a road.

The present invention provides GPS-based systems used for painting or otherwise marking roadway traffic lane demarcation lines and vehicle mounted locating and inspection systems for determining the geographical location and condition of roadway marks. Referring now to the drawing, in which like reference numbers refer to like elements throughout the various figures that comprise the drawing, FIG. 1 shows a moving or self-propelled vehicle 1 which is located on a road or roadway 2 near a line 3 applied to the surface of the road 2. Also shown is a roadway edge boundary line 4. The term "vehicle" used in this document is given its broadest meaning, including any conveyance, motorized device, or moving piece of mechanical equipment for transporting passengers or apparatus. More specific and preferred examples of vehicles 1 are cars, vans, trucks, snow plows, construction equipment, and road marking machines. The terms "road" and "roadway" are used interchangeably in this document to include any road, highway, street, avenue, alley, boulevard, bridge, viaduct, trestle, or the like, and approaches to them (including public and private roads and parking lots) designed or ordinarily used for vehicular travel.

Roadway Marking

According to one embodiment, the present invention provides an apparatus for placing marks on a resurfaced roadway 2. The apparatus includes a GPS-based locator for sampling discrete geographical location data of a pre-existing roadway mark evident on the roadway 2 before resurfacing; a computer 27 for determining a continuous smooth geographical location function fitted to the sampled geographical location data; and a marker responsive to the GPS-based locator and geographical location function for replicating automatically the pre-existing roadway mark onto the resurfaced roadway 2.

Figure 2:
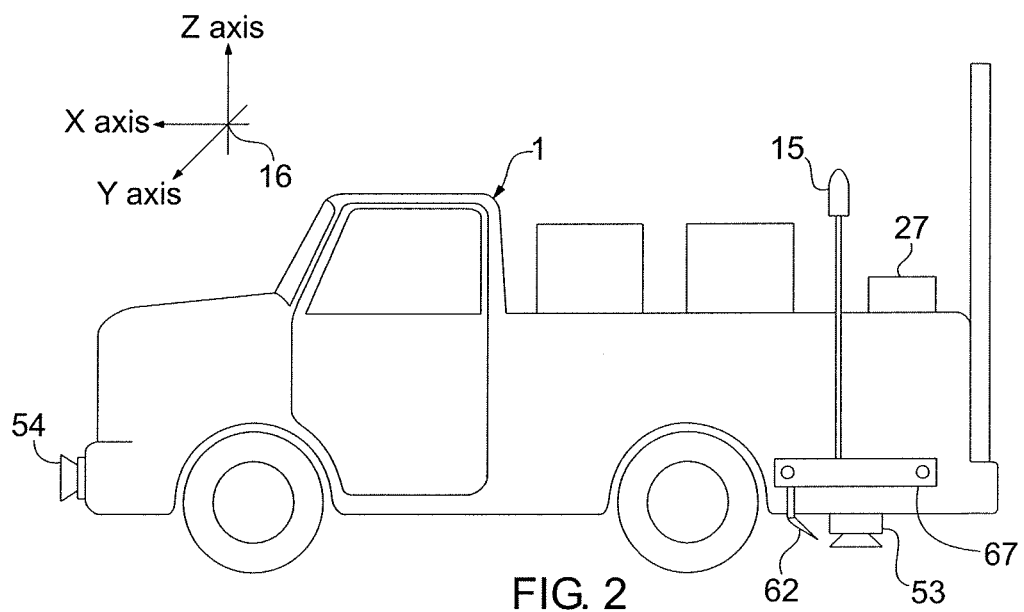
FIG. 2 is a diagrammatic side view of a vehicle fitted with the apparatus according to the present invention, illustrating additional components of the apparatus.

As illustrated in FIG. 2, the vehicle 1 is fitted with a number of components. Specifically illustrated in FIG. 2 are a GPS antenna 15, a computer 27, a first imager 53, a second imager 54, a nozzle array and control system 62, and a moveable cross track carriage 67. FIG. 1 shows that the vehicle 1 may be fitted with any number of second imagers 54 (three are shown).

Figure 3:
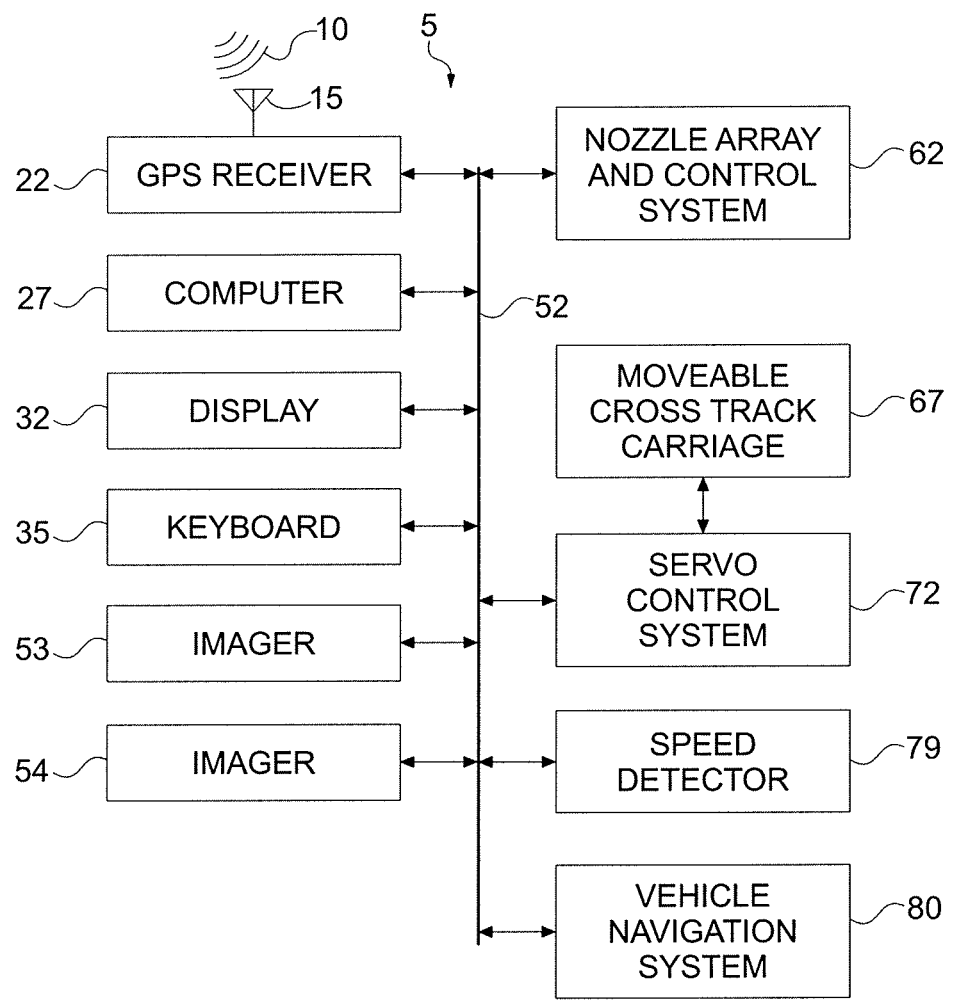
FIG. 3 is a schematic block diagram illustrating components of a preferred embodiment of the apparatus according to the present invention.

FIG. 3 is a schematic block diagram 5 illustrating components of a preferred embodiment of the apparatus according to the present invention. The preferred embodiment comprises a number of components and systems which include the GPS antenna 15, a GPS receiver 22, the computer 27, a visual display 32, a keyboard 35, the first imager 53, the second imager 54, the nozzle array and control system 62, the moveable cross track carriage 67, a servo control system 72, a speed detector 79, and a vehicle navigation and control system 80. All of the components and systems with the exception of the moveable cross track carriage 67 are electrically interconnected, and in communication with each other, for example, via a bus 52.

The GPS antenna 15 receives GPS radio wave signals 10 which originate from a GPS satellite system or a GPS-pseudolite array (not shown). "Pseudolite" is a contraction of the term "pseudo-satellite," used to refer to something that is not a satellite which performs a function commonly in the domain of satellites. Pseudolites are typically small transceivers that are used to create a local, ground-based GPS alternative. The range of each transceiver's signal depends on the power available to the unit. Being able to deploy one's own positioning system, independent of the GPS, can be useful in situations where the normal GPS signals are either blocked or jammed (e.g., in deference to military conflicts), or simply not available.

The GPS antenna 15 is connected to the input of the GPS receiver 22, which decodes the GPS signals 10 for determining its geographical location. The receiver 22 is further electrically connected to the bus 52, and is in bi-directional communication with the other components and systems connected to the bus 52. The GPS geographic position of the antenna 15 is adjusted to account for any physical separation of the nozzle array and control system 62 from the antenna 15, so that the actual geographical position of the nozzle array and control system 62 is determined by the decoded GPS signals 10.

Figure 4:
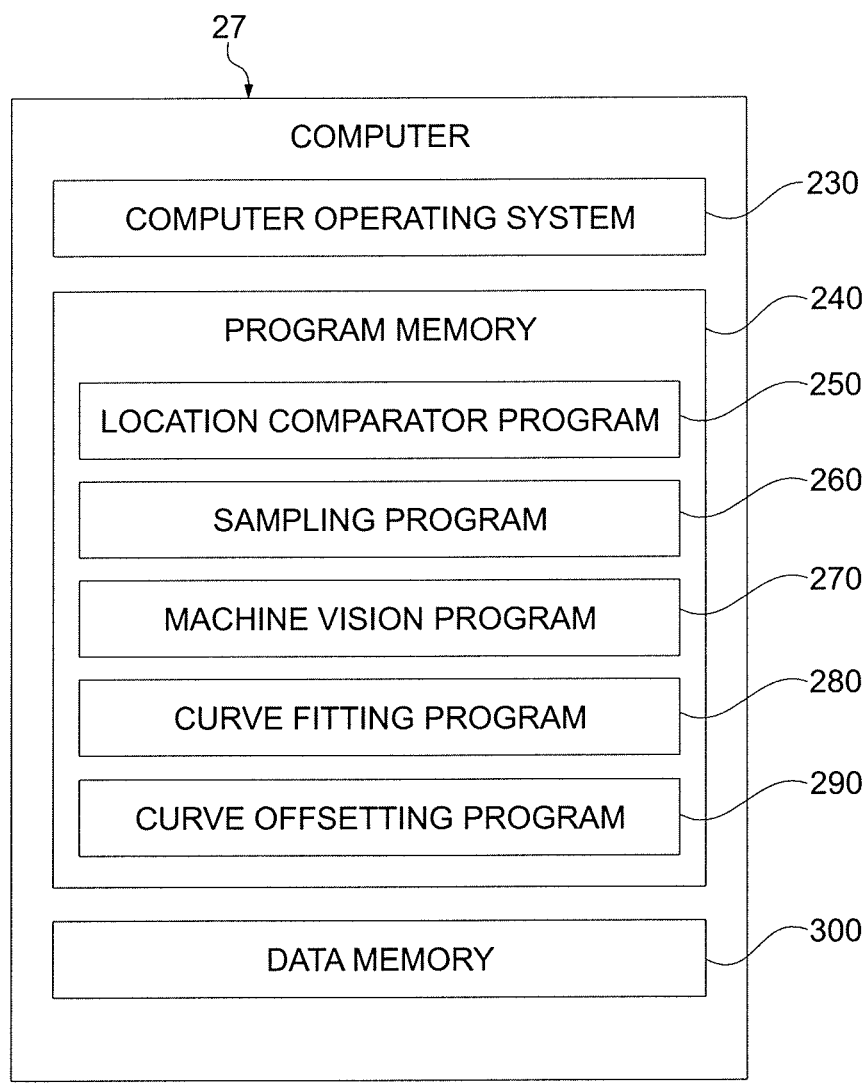
FIG. 4 is a schematic block diagram illustrating components of a computer of the preferred embodiment of the apparatus shown in FIG. 3.

The computer 27 is a conventional computer having data and program memory as shown in FIG. 4. Operating system (OS) software 230 is a conventional operating system such as Windows 7 manufactured by Microsoft, a Unix-based OS, or an Apple Computer OS X Lion operating system. The computer 27 also has program memory 240 and data memory 300, in addition to the memory required by the operating system 230. The computer 27 further has a real-time time base for calculating accurate time intervals (not shown).

The program memory 240 comprises a location comparator program 250, a sampling program 260, a machine vision program 270, a curve fitting program 280, and a curve offsetting program 290. The location comparator program 250 compares the current adjusted GPS location received by the antenna 15 and decoded by the GPS receiver 22 to previous GPS locations stored in data memory 300 (along with the characteristics of the pre-existing roadway mark, including type, geometry, and dimensions). The location comparator program 250 then determines the difference between the current adjusted and the stored GPS locations.

The sampling program 260 receives a GPS reference location and constructs an orthogonal Cartesian (or other conventional) coordinate system (grid system) 16 (see FIG. 2) having the origin defined at the reference location and further, based upon the constructed grid system and the distance sampling interval, samples the geographical location of the pre-existing roadway mark. The machine vision program 270 inputs data from the imagers 53 and 54 and performs edge detection, geometric computations, and other generic machine vision operations on the image data from the imagers 53 and 54.

The curve fitting program 280 inputs discrete GPS coordinate data stored in the data memory 300 and determines a first continuous mathematical function which fits the discrete GPS coordinate data. The curve offsetting program 290 inputs the continuous function determined by the curve fitting program 280 and generates a second continuous function similar and parallel to the first function but offset from the first function by a given distance. For example, the first function may represent the center mark line 3 on the road 2. A second function defining a roadway edge mark line 4 may be derived from the first function by offsetting the first function by a distance, or the first function may represent a roadway edge mark line 4 and the center mark line 3 may be derived from the first function by offsetting the first function by a distance.

Thus, the present invention can further be embodied in the form of computer-implemented processes and apparatus for practicing such processes, for example, and can be embodied in the form of computer program code embodied in tangible media, such as floppy diskettes, fixed (hard) drives, CD ROM's, magnetic tape, fixed/integrated circuit devices, or any other computer-readable storage medium, such that when the computer program code is loaded into and executed by the computer 27, the computer 27 becomes an apparatus for practicing the invention. The program also may be embodied in a carrier where the carrier may be a tangible media or a transmitted carrier wave.

Figure 5:
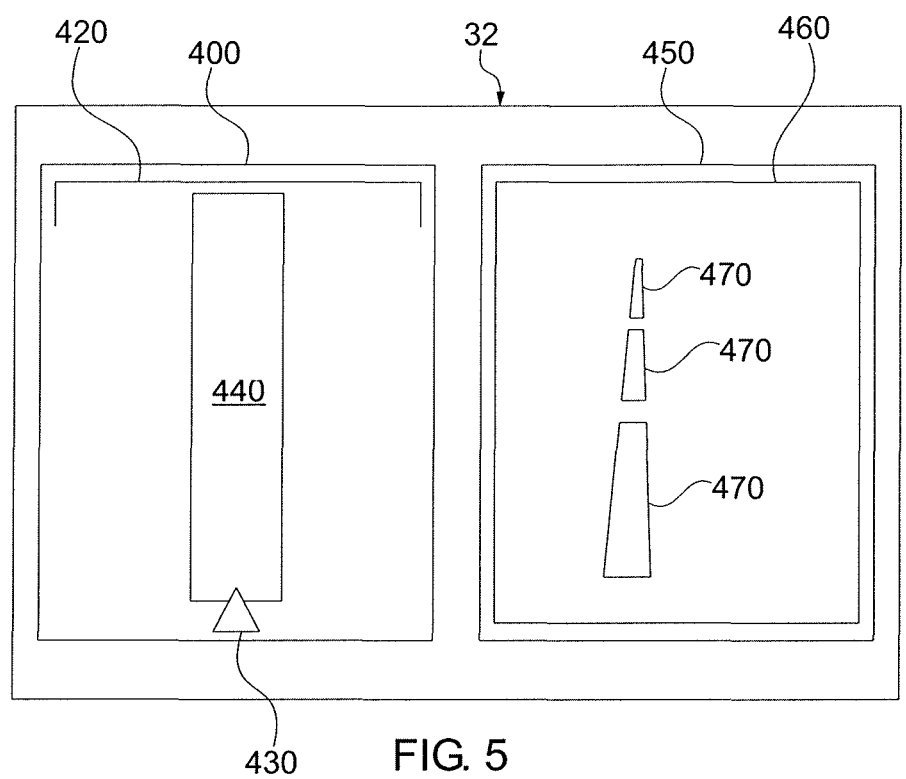
FIG. 5 is a schematic block diagram illustrating components of a display of the preferred embodiment of the apparatus shown in FIG. 3.

The display 32 is a conventional or heads-up computer display adapted to present information to an operator. The display 32 is capable of displaying one or more windows such as an operator may view using a windows-based operating system. Preferably the display 32 contains a left window 400 and a right window 450 as shown in FIG. 5. The left window 400 displays the image from the first imager 53. Displayed within the left window 400 are a cross travel bar 420; a yellow, rectangle-shaped roadway mark 440 imaged by the first imager 53 located proximate the rear of the vehicle 1; and the position of the nozzle array and control system 62 represented by the arrow 430. The right window 450 of the display 32 depicts the image from the second imager 54 which images the roadway mark path 470 in front of the vehicle 1. Also displayed within the right window 450 is a red alignment box 460.

The keyboard 35 permits the operator to manually enter data similar to a conventional computer keyboard. The keyboard 35 is connected to the bus 52. Alternatively, the keyboard 35 may be directly connected to the computer 27.

The first imager 53 may be fixedly attached to the vehicle 1. As illustrated in FIG. 2, the first imager 53 is downwardly focused onto the surface of the road 2 such that its field of view includes the entire roadway surface under the moveable cross track carriage 67. The second imager 54 is also fixedly attached to the vehicle 1 and, as illustrated in FIGS. 1 and 2, focused to image the roadway surface in front of the vehicle 1 so that a clear image of the roadway mark is visible.

The nozzle array and control system 62 is mounted onto the moveable cross track carriage 67. One or more nozzle jets may be incorporated into the nozzle array and control system 62 for spraying (or otherwise placing or delivering) one of more lines of paint (or any other suitable marking material). The paint may be the same or a different color. Other material may be sprayed onto the surface of the road 2 with the paint, such as glass beads instead of just the paint. In addition, the nozzle array and control system 62 is responsive to the speed of the vehicle 1, as determined by the speed detector 79, and adjusts the dispensing rate of the paint dependent upon the speed of the vehicle 1 to maintain the same paint thickness irrespective of the speed of the vehicle 1. The nozzle array and control system 62 compensates for positional offsets of the individual jets, such that the GPS coordinates for the individual jets are determined.

The moveable cross track carriage 67 may be (although not necessarily) mounted on the rear (as shown in FIG. 1) or on the back driver's side (as shown in FIG. 2) of the vehicle 1. The moveable cross track carriage 67 laterally moves to position the nozzle array over the roadway mark line. Hydraulic or electrical actuators mounted on the vehicle 1 are used to position the moveable cross track carriage 67 over the roadway mark line.

The servo control system 72 is responsive to control signals placed onto the bus 52 and is responsive to the machine vision program 270. The servo control system 72 controls the hydraulic or electrical actuators. Thus, the servo control system 72 controllably moves the moveable cross track carriage 67 to a desired cross track position.

The speed detector 79 determines the speed of the vehicle 1. The vehicle speed may be determined by conventional mechanisms such as an electronic speedometer.

The vehicle navigation system 80 is a conventional automated system for controlling the direction, speed, and acceleration of the vehicle 1 along a predetermined path. By "predetermined" is meant determined beforehand, so that the predetermined characteristic must be determined, i.e., chosen or at least known, in advance of some event. The navigation system 80 includes both the hardware and software necessary to completely control the movement of the vehicle 1 along a path without human intervention. The apparatus described above forms a GPS-based system used for painting, or otherwise "marking," roadway traffic lane demarcation lines.

In operation, the apparatus according to the present invention can be used as follows. The operator of the vehicle 1 first positions the vehicle 1 at the start of the desired roadway mark and in a direction of travel for recording the mark path. The first imager 53 images the surface of the road 2 under the complete moveable cross track carriage 67 travel distance and the operator positions the vehicle 1 so that an image of the roadway mark appears in the left window 400 of the display 32. The machine vision program 270 recognizes the roadway mark and determines the amount of cross travel necessary to align the cross travel carriage 67 to the mark center. A control signal is then sent to the servo control system 72 from the machine vision program 270 to move and align the moveable cross track carriage 67 having the attached nozzle array and control system 62 to the center of the mark. Alignment is displayed as a red arrow 430 centered on the imaged roadway mark 440. The imaged mark along with the aligned red arrow relative to the cross travel bar 420 is shown in FIG. 5. The cross travel bar 420 gives the operator a visual indication of the maximum cross travel distance of the moveable cross track carriage 67.

The operator then enters the positional sampling interval by using the keyboard 35, which is then sent by the computer 27 to the sampling program 260. The operator then depresses a "Start-to-Record" key on the keyboard 35 which begins the process of recording the geographical location and characteristics of the mark. The reference location is determined as the geographical position of the aligned moveable cross track carriage 67 (corrected for any positional offsets of the antenna 15) when the Start-to-Record key is depressed. The roadway mark may be a solid or dashed, single or double line, or any combination thereof. For example, a roadway mark may consist of a solid line and a parallel dashed line in close proximity to the solid line, such as a conventional roadway mark to indicate that passing in one direction is allowed but passing in the opposite direction is not allowed.

Once the Start-to-Record key is depressed, the computer 27 begins to input the vehicle speed data from the speed detector 79. The operator then begins to move the vehicle 1 in the direction of the roadway mark path 470 and uses the right window 450 of the display 32 to assist in maintaining the vehicle path coincident with the roadway mark path 470 (shown for a middle rear mounted cross track carriage 67, see FIG. 1). The operator steers the vehicle 1 so that the roadway mark path 470 is maintained within the red alignment box 460. Maintaining the vehicle 1 within the red alignment box 460 insures that the servo control system 72 along with the machine vision program 270 will be able to position the moveable cross track carriage 67 within the cross travel limitations indicated by the cross travel bar 420 of the moveable cross track carriage 67 along the roadway mark path 470.

Geographical position data of the mark are sequentially sampled and stored in the data memory 300 of the computer 27 using the sampling program 260 and the Cartesian coordinate system (see the orthogonal x, y, and z axes shown in FIG. 2). The geographical positional sampling occurs at a distance interval previously defined by the operator along one of the Cartesian coordinate system axis. Sampling of the geographical position for the roadway mark path 470 occurs when the vehicle 1 has travelled the sampling interval which is calculated by the sampling program 260 using the decoded GPS positional data from the GPS receiver 22 and the Cartesian coordinate system. Alternatively, the sampling distance can be calculated using the speed detector 79 and the time base of the computer 27.

As the vehicle 1 passes over the mark, the computer 27 determines the length, width, color, and the number of lines (single, double) of the mark by using the machine vision program 270 and the speed of the vehicle 1 derived from the speed detector 79 and the time base of the computer 27. The characteristics of the mark are also stored within the data memory 300. If the mark characteristics change from one form to another as the vehicle 1 transverses the roadway mark path 470, the machine vision program 270 recognizes the change in the mark characteristics and stores the geographical location of the change, along with the new mark characteristics. For example, dashed marks may change to a solid line mark, and a double solid line mark may change to a single dashed line mark. The geographical position of the change in mark characteristics is recorded along with the sampled mark path.

At the end of the roadway mark path 470, the operator depresses a "Stop-Record" key on the keyboard 35, which terminates the process of sampling and storing the mark geographical location and mark characteristics. In addition, upon depression of the Stop-Record key, the curve fitting program 280 determines a continuous mark path function using a curve fitting algorithm over the mark path interval using the Cartesian coordinate system determined by the sampling program 260. The original mark path is now defined as a continuous function referenced to the start location and to the grid pattern of the Cartesian coordinate system.

The roadway is now ready to be repaved. The process of repaving completely covers all remnants of the old roadway mark. Alternatively, the old roadway mark is removed by physical mechanisms such as by wire brushing, by grinding, by water jetting or blasting, or by some other conventional mechanism.

To re-establish or replicate the roadway mark at the same location, the location comparator program 250 compares the current GPS location of the moveable cross track carriage 67 (along with the nozzle array and control system 62 with positional offset correction) with the reference location previously stored in the data memory 300. The location comparator program 250 then further displays positional instructions to the operator of the vehicle 1 in the left window 400 of the display 32 for assisting the operator in positioning the red arrow of the moveable cross track carriage 67 in close proximity to the reference position.

Once the vehicle 1 has been approximately positioned at the reference point, the machine vision program 270 displays the original mark previously stored in the data memory 300 into the left window 400 of the display 32 and commands the servo control system 72 to move the cross travel carriage 67 into alignment with the reference position. In addition, the right window 450 of the display 32 now displays the original mark path for the operator to follow along with the red alignment box 460 to assist the operator in maintaining alignment of the cross track carriage 67 to the desired position given by the previously determined mark path continuous function.

After the cross track carriage 67 has been aligned with the reference position, the operator depresses the "Start-to-Repaint" key on the keyboard 35 and begins to move the vehicle 1 along the roadway mark path 470 displayed (along with the actual mark) in the right window 450 of the display 32. The displayed roadway mark path 470 is now derived from the mark path continuous function.

As the vehicle 1 moves, the location comparator program 250 compares the position of the cross track carriage 67 with the roadway mark path 470 defined by the continuous function and generates an error signal representing the difference between the actual cross track carriage 67 geographical position and the continuous function mark path geographical position. This error signal is used by the servo control system 72 to move the cross track carriage 67 back onto the roadway mark path 470 defined by the continuous function. As the vehicle 1 moves along the roadway mark path 470 defined by the continuous function, the previously stored mark location and characteristic data are compared to the current (position corrected) GPS location of the cross track carriage 67 and the respective mark is replicated onto the surface of the road 2 by the nozzle array and control system 62.

Depending upon the speed of the vehicle 1, the nozzle array and control system 62 dispenses the appropriate volume of paint responsive to the speed of the vehicle 1 derived from the speed detector 79 to maintain the desired paint thickness. For example, a slow moving vehicle 1 would dispense paint at a slower rate than that for a fast moving vehicle 1 which would require dispensing paint at a faster rate to maintain consistency of paint thickness.

The apparatus and method described above in accordance with a preferred embodiment of the invention give the operator the ability to sample an existing roadway mark using GPS or pseudolite technology. Sampling of the roadway mark requires discrete geographical points which may be accomplished, depending upon the acquisition speed of the geographical positioning system, at a sampling vehicle speed which will minimally impact the flow of regular traffic.

The apparatus and method use conventional curve fitting techniques to produce a continuous function representing the mark path from the sampled data points and yield a consistently smooth curve. Such curve fitting techniques are unlike the joining of linear line segments which have a tendency to have a jagged, or "put-together," appearance. The curve fitting of only one roadway mark (e.g., the centerline of a mark) is required and any additional roadway marks (e.g., the roadway edge boundary line 4) may be obtained by offsetting the continuous function derived from a first continuous mark path by an amount consistent with the desired relative position of the second mark path. For example, to define a side roadway mark using a centered defined functional mark path requires only a simple mathematical operation of offsetting the original functional mark path by a desired distance (typically the width of the traffic lane). This technique guarantees exact parallel placement of the side mark with respect to the center mark.

In addition, the actual sampling of a pre-existing roadway mark ensures that, after repavement of the roadway 2 is completed, the new repainted mark will be placed in exactly the same position on the roadway 2 as the previous mark. For known systems that convert a drawing pattern into geographical coordinates for painting a surface, a problem arises in the field where the actual drawn pattern is not compatible with the actual field requirements. For example, sometimes the roadway must be changed as the result of a rock formation or other obstructions. Further, roadway positions are frequently changed to accommodate commercial or residential development in a particular area. A predetermined drawing pattern unfortunately does not reflect the reality of changes in the road position as the result of field-induced changes. Thus, any system using a drawing pattern may not reflect the actual road position and, therefore, may not accurately mark the roadway 2. The apparatus and method according to a preferred embodiment of the invention avoid these problems.

Another improvement over the known systems is that the original roadway mark is characterized according to type (color, dashed, continuous, or other) and geometrical dimensions (length, width, and the like). This is an important consideration for maintaining the exact mark sequence for a mark path. For example, a portion of the mark path may have a dashed yellow mark and another portion of the mark path may have a continuous white mark. This information is used to selectively choose the correct color and also to control the spray width and dispensing cycle so that the original mark may be exactly reproduced.

The apparatus and method for placing (printing) marks on a resurfaced roadway 2, according to a preferred embodiment of the invention, achieve numerous additional advantages over the known technology. Among those advantages are the following:

1. Geographically sampling the coordinates of pre-existing roadway marks using GPS technology;
2. Computing a continuous function to determine the mark path from the mark samples;
3. Automatically duplicating and re-painting the roadway mark patterns depending upon the previous mark pattern;
4. Accurately depositing roadway mark patterns such as continuous or dashed lines independent of the speed of the vehicle 1;
5. Providing for automatic and semi-automatic vehicle alignment and/or movement on the mark path;
6. Automatically determining pre-existing mark geometric characteristics;
7. Coordinating the material spray dispensing rate in response to vehicle speed;
8. Protecting workers completely from vehicular traffic and weather;
9. Reducing work force requirements because only one operator is required both to determine the geographical coordinates of existing roadway marks and to re-paint the marks;
10. Converting the mark samples and geometric characteristics into a pattern;
11. Automatically adding a positional offset to re-paint other roadway marks which can be mathematically offset from the sampled mark path; and
12. Providing for a smooth and continuous mark path.

The apparatus and method for placing marks on a resurfaced roadway 2, according to a preferred embodiment of the invention, use a GPS-based location system to sample the geographical position of an existing roadway mark. Although many of the known patents use GPS for positional information to determine the location of vehicles, the apparatus and method of the present invention singularly use GPS to determine the geographical position of an existing roadway mark. The advantages of determining the roadway mark before repaving or re-painting include: (1) determining the exact location of the mark; and (2) from this information, using a mathematical model to form a continuous geometrical function of the mark path. The GPS-based location system includes any GPS pseudolite or GPS-like, self-calibrating, pseudolite array system and is not restricted to any one GPS technology.

Geographical sampling requires discrete geographical data along the mark path. A continuous geographical path is not required. A vehicle 1 equipped with the apparatus of the present invention will be able to travel at moderate speed with respect to the current traffic flow and will only need to sample the roadway mark along the mark path at discrete points.

The apparatus of the present invention uses the sampled positions of the roadway mark to determine a continuous mathematical function which provides a smoothly varying function representing the actual mark path. Although the Manning patents disclose that the designer of a drawing pattern can use linear interpolation between two points for a roadway mark, and then these individual line segments can be joined to make a relatively long continuous painted line, or the designer may use a pre-existing equation using known geographical location coordinates as independent variables within the drawing pattern, no mathematical computation is disclosed which determines a "best fit" continuous geographical location equation based upon the actual sampled roadway mark locations. The apparatus of the present invention calculates a "best fit" equation.

The apparatus also automatically re-paints roadway marks depending upon the previous mark type. The mark type and dimensional characteristics are used in combination with the determined vehicle speed to control the paint dispensing unit.

Thus, the unit accurately and uniformly re-paints the prior existing mark onto the repaved or milled roadway surface.

The apparatus provides for automatic and semi-automatic vehicle alignment and movement on a path. A vehicle navigation system (an "auto-pilot") maintains the vehicle 1 on the roadway mark path 470. The desired mark location is mathematically determined using sampled geographical positions from the old mark. A comparison is then made between the actual mark location and the desired mark location. An error signal is determined based upon this difference which is used by the auto-pilot to correct the position of the vehicle 1.

A visual indication of the position of the vehicle 1 with respect to the roadway mark path 470 is also provided. The display 32 helps the driver of the vehicle 1 in steering and maintaining the position of the vehicle 1 on the desired roadway mark path 470. The display 32 preferably illustrates the actual mark path of the vehicle 1 as computed by the previously sampled mark path, and therefore a conventional guide wheel and guide wheel support bracket or other assistive pointer devices are not required. The visual indication of the position of the vehicle 1 with respect to the roadway mark path can also assist the driver of a snow plow to maintain the proper position on the roadway.

During the sampling process for determining the geographical location of the roadway mark path 470, the apparatus also automatically determines the type and dimensional characteristics (for example the length and width and, if appropriate, the spacing distance between marks) of the roadway mark. For example, the mark may be a dashed sequence or may be a solid line. If the mark is a dashed line, the apparatus is capable of determining the spacing between the dashes. Thus, the apparatus of the present invention automatically determines existing roadway mark characteristics.

The material spray dispensing rate is responsive to vehicle speed. This feature of the apparatus is important toward depositing a consistent and uniform amount of paint onto the road 2. If the dispensing rate is held constant, a different amount of paint could be deposited onto the road 2 depending upon the speed of the vehicle 1. For example, a slow moving vehicle 1 would deposit a greater amount of paint than a faster moving vehicle 1 with a constant dispensing rate.

Like known devices, the apparatus of the present invention uses a predetermined path, map, or image for the paint dispenser or vehicle 1 to follow. A significant difference between the apparatus and known devices, however, is how the predetermined path is obtained. The apparatus creates a digital image of the surface before painting or marking the surface. A crude image is scanned (the image is mapped) and then an enhanced version is reprinted over the original crude image. The apparatus also mathematically models the predetermined path using sampled geographical data of the original mark path. The sampled data are obtained using a GPS.

The apparatus also uses any conventional paint (or other material) to place (paint or deposit or apply) the marking on the road 2. The material need not be modified. Some conventional devices modify the marker material in order to function. For example, U.S. Pat. No. 4,219,092 discloses using a radioactive paint as the marker material. The radioactive emission of the paint is then differentially detected by the vehicle and used to guide the vehicle along the predetermined path. It is an advantage of the apparatus according to the present invention, of course, that the material need not be modified.

Other conventional devices convert a drawing pattern produced from an application drawing program into a geographically defined image in suitable form for being deposited onto a surface using GPS technology. Still other conventional devices use a drawing tool to draw polygons to define geographical areas of interest for farming or other applications. The apparatus according to the present invention does not require a drawing pattern, and in fact can create the actual mark path for other purposes.

One of those other purposes is the creation of another parallel path which is derived from the original continuous mark path. The apparatus calculates a parallel path displaced from the calculated continuous mark path which was derived from the sampled original roadway mark. For example, having the calculated continuous mark path such as the center line of a roadway, a positional offset can be used to calculate another mark path which parallels the center line. This second mark path could be the roadway side mark line. An advantage of the apparatus is that only one roadway mark is required.

Potential applications for the apparatus and method of the present invention are many and varied. The primary application is, of course, re-painting of demarcation line marks on roads. Related applications include the deposition of replacement marks on highways, parking lots, air landing fields, pathways, or walkway structures designed for vehicular, foot, or other traffic. In addition to marking pavement, the apparatus and method can re-mark a playing field for a sport such as football.

The apparatus and method can also be applied to assist snow plows, specifically by providing a snow plow truck guidance system. Such a system can guide a vehicle 1 having a snow plow along a roadway. The GPS-based locator samples discrete geographical location data of a pre-existing roadway mark. The computer determines a continuous smooth geographical location function fitted to the sampled geographical location data. An actuator responsive to the GPS-based locator and geographical location function then positions the snow plow.

Another application for the apparatus and method is re-applying or re-depositing a demarcation line mark as a coating on a surface. The coating may be hard or soft, permanent or transitory. The mark may be formed by causing a coating material to extend, impregnate, or penetrate into the surface material; the term "coating" is used in the general sense to include both surface coating and impregnation. Preparatory treatments of the surface material, subsequent treatments of the coated surface material, and other ancillary non-coating operations are also envisioned. Such operations include processes like etching to make the surface more compatible with, or adherent to, the coating. The coating can form lines, stripes, or indicative markings and can contain material particularly adapted to reflect light.

Roadway Mark Locator and Inspection Apparatus

According to another embodiment of the invention, an apparatus for determining the geographical location of a roadway mark 20, 25, 30 from a moving vehicle 1 may include at least one vehicle mounted imager 50, 60 responsive to a trigger signal for imaging at least one roadway mark located substantially parallel to the direction of travel of the vehicle 1; GPS antenna 510; a GPS receiver 22 responsive to the GPS antenna 510 for determining the geographical location of the GPS antenna 15; an apparatus for providing a GPS receiver synchronized image trigger signal to the imager 50, 60; and an apparatus for determining the GPS geographical location of the roadway mark 20, 25, 30 from the triggered roadway mark image and the geographical location of the GPS antenna 510.

Figure 6:
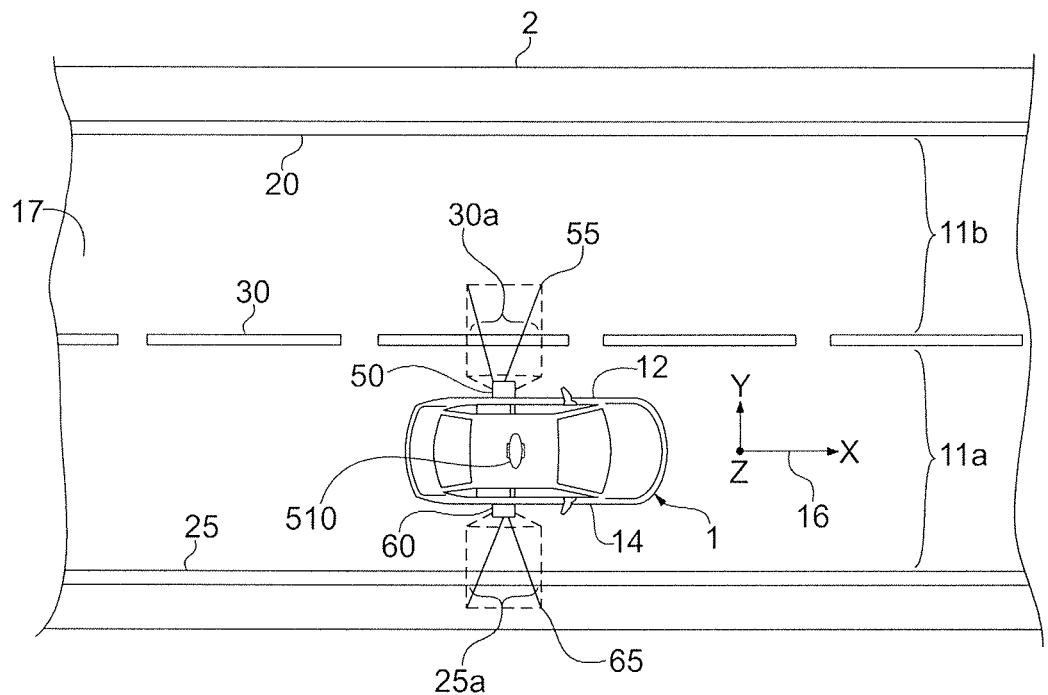
FIG. 6 is a top view of a vehicle having one embodiment of the invention and moving along a roadway lane defined by roadway marks.

FIG. 6 illustrates a top view of a moving vehicle 1 travelling along the x-axis defined by Cartesian coordinate system 16 and within a demarcated traffic lane 11a of roadway 2. Roadway 2 has a paved top surface 17. Traffic lane 11a is demarcated with pre-existing roadway dashed center mark 30 and pre-existing roadway edge mark 25. In addition, a traffic lane 11*b* is demarcated also by the dashed center mark 30 and roadway edge mark 20. Mark 30 and marks 20 and 25 are located on top surface 17 of roadway 2 and are usually composed of epoxy, paint (with or without reflective glass beads), thermoplastic markings, or other materials commonly used in the roadway marking industry. Marks 30 and 25 are visible from the moving vehicle 1. A left side panel 12 (conventionally referred to as the driver's side for American-built vehicles) of vehicle 1 faces mark 30 and a right side panel 14 (conventionally referred to as the passenger's side for American-built vehicles) of vehicle 1 faces edge mark 25.

Figure 7:
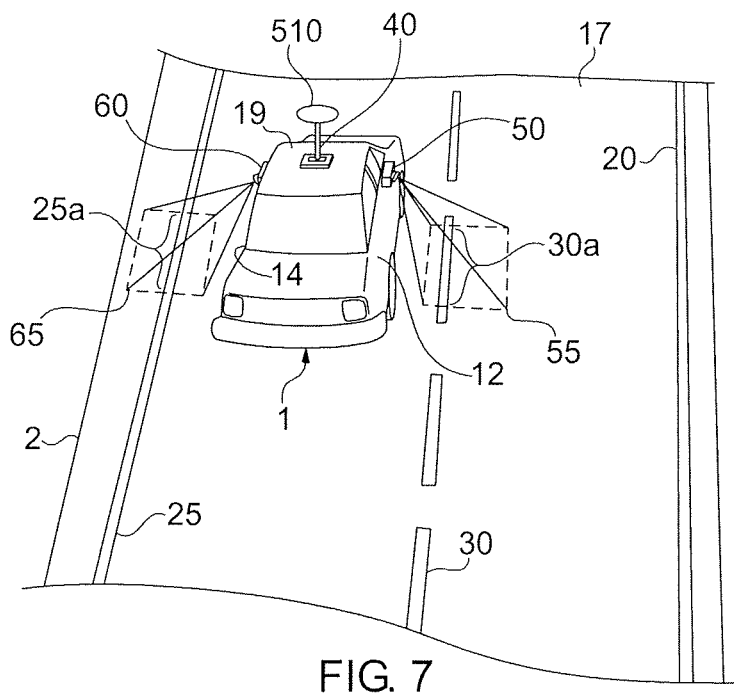
FIG. 7 is a front view of the vehicle shown in FIG. 6 illustrating the placement of the GPS antenna and side mounted imagers.

Referring now to FIGS. 6 and 7, vehicle 1 has a fixed GPS antenna 510 supported above the roof 19 of vehicle 1 by a support 40. The first imager 50 is mounted on the left side of vehicle 1 and is adjustably positioned to image an area 55 of the roadway top surface 17 to the left of the direction of travel of vehicle 1 which includes a section 30*a* of mark 30. The second side mounted imager 60 is adjustably positioned onto the right side of vehicle 1 to image an area 65 of roadway top surface 17 which includes a section 25*a* of edge mark 25. Further, it is understood that imagers 50 and 60 could be mounted in any suitable location (e.g., on roof 19 of vehicle 1 in close proximity to the left and right sides of vehicle 1 and similarly positioned to image areas 55 and 65, respectively). The GPS receiver 22 is electrically connected to GPS antenna 510 and is contained within vehicle 1 (GPS receiver 22 is not explicitly shown in FIG. 6 or 7).

The description above refers to the standard direction for vehicular traffic defined for United States roadways. The preferred embodiment also applies to roadways 2 having the direction of vehicle traffic defined opposite that of the United States such as that found in Europe. In this case, second imager 60 would image center mark 30 and imager 50 would image edge mark 20. Further, lane 11*b* could carry traffic in the opposite direction of vehicle 1, or could be a second lane of a multi-lane highway carrying additional traffic in the same direction as vehicle 1.

Figure 8:
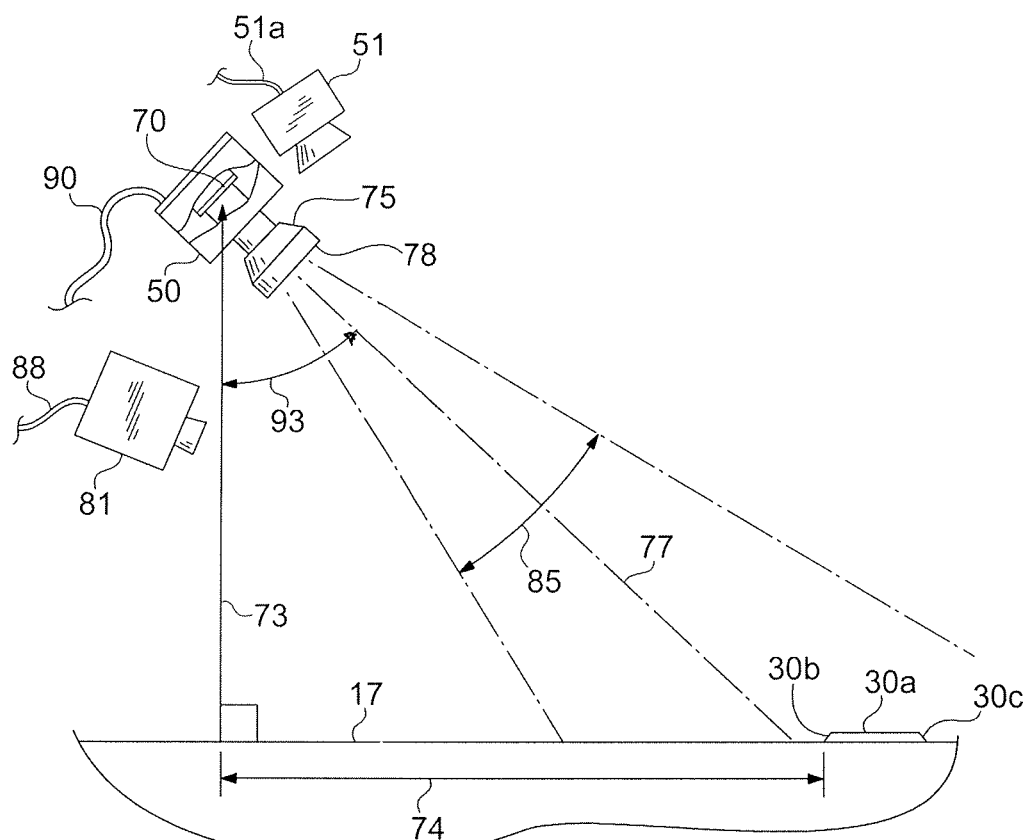
FIG. 8 is a detailed side view of a first imager positioned to image a roadway mark.

Referring now to FIG. 8, a partially cut away side view of imager 50 is shown imaging roadway top surface 17. The adjustable mounting system affixing first imager 50 to vehicle 1 is not shown in FIG. 8 but is further discussed in reference to FIG. 9. The following discussion specifically refers to first imager 50; it should be understood, however, that the discussion also pertains to second imager 60.

Mounted within first imager 50 is an imaging sensor 70. The center of imaging sensor 70 is vertically displaced from roadway top surface 17 by a vector 73 which is normal to roadway top surface 17 and a distance 74 from mark edge 30*b*. Imaging sensor 70 is preferably a conventional charge-coupled device (CCD) or may be an active pixel complementary metal-oxide-semiconductor (CMOS) sensor, having a square or rectangular array of sensor pixels (not shown). A CCD is a device for the movement of electrical charge, usually from within the device to an area where the charge can be manipulated, for example conversion into a digital value. This movement is achieved by "shifting" the signals between stages within the device one at a time. CCDs move charge between capacitive bins in the device, with the shift allowing for the transfer of charge between bins.

Figure 11:
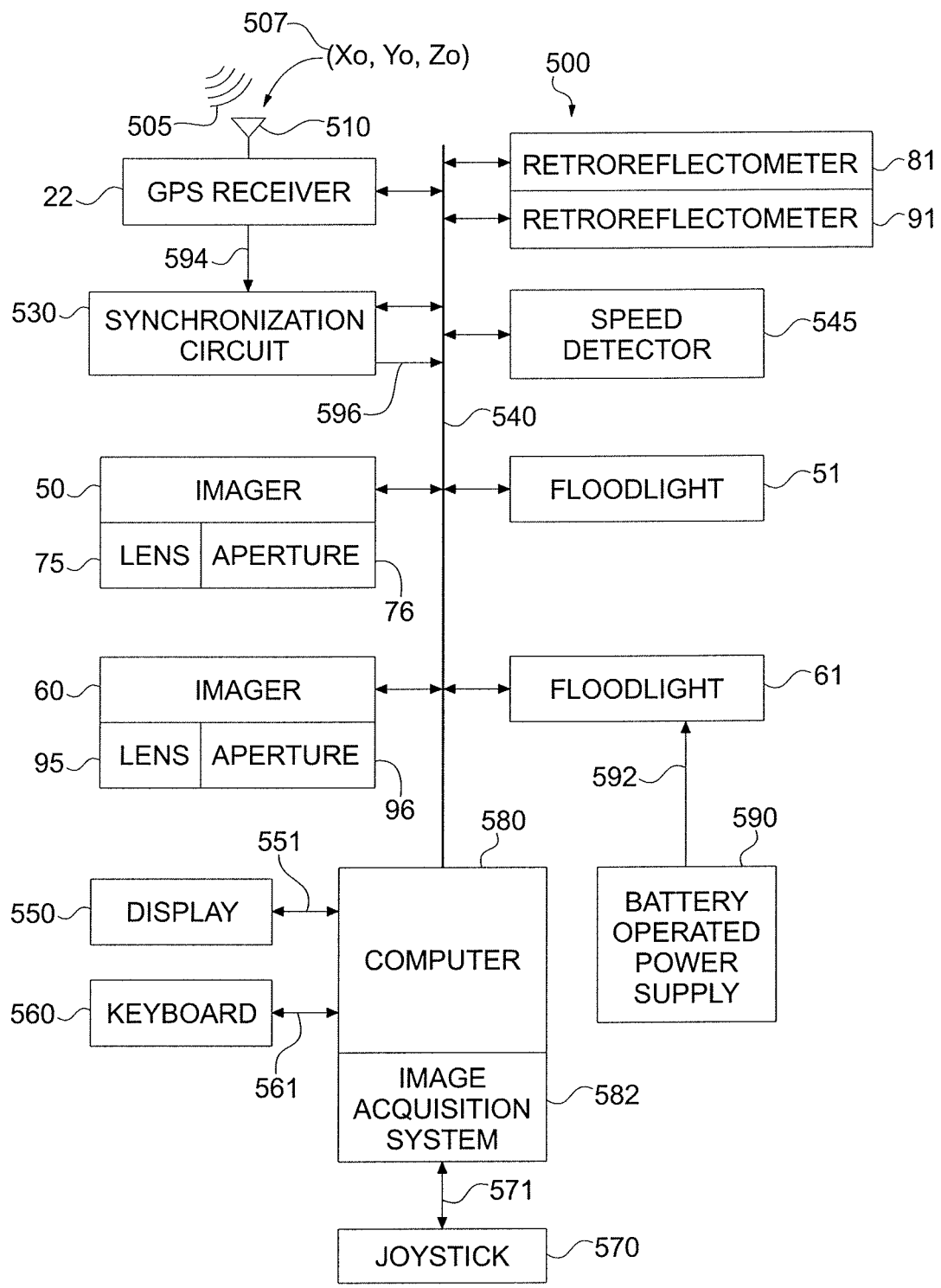
FIG. 11 is a block diagram of one embodiment of the invention.

Affixed to first imager 50 is an electronically adjustable optical lens element 75 having an optical axis 77 and an electronically adjustable aperture 76 (see FIG. 11). Further affixed to lens element 75 is an optical filter 78. An angle 93 defines the acute angle between normal vector 73 and optical axis 77. Preferably, the center of sensor element 70 coincides with optical axis 77. Likewise, affixed to second imager 60 are an electronically adjustable optical lens element 95 (see FIG. 11), an electronically adjustable aperture 96 (see FIG. 11), and an optical filter 97 (not shown but corresponding to the optical filter 78 affixed to first imager 50).

Data and control signals are able to communicate with first imager 50, lens element 75, and adjustable aperture 76 via a flexible cable 90. Cable 90 also includes power cables to supply the necessary electrical power to first imager 50 and electronically adjustable lens element 75 and aperture 76.

Lens element 75 and aperture 76 define an angular field of view 85 of first imager 50 and focus objects within angular field of view 85 onto imaging sensor 70. Angular field of view 85 preferably includes section 30*a* of roadway mark 30 including mark edges 30*b* and 30*c*. Likewise, lens element 95 and aperture 96 define the angular field of view of second imager 60 and focus objects within this angular field of view onto the imaging sensor of second imager 60.

It is noted that roadway mark 30 shown in FIGS. 6 and 7 is a dashed line. Roadway mark 30 could be a solid line, a double solid line, or any mark type currently used on roadways. Likewise, edge marks 20 or 25 could be any mark type currently used on roadways.

Also shown in FIG. 8 is conventional floodlight 51. Floodlight 51 is positioned above first imager 50 and is affixed to left side panel 12 by a conventional mechanism. Floodlight 51 illuminates image area 55 in low ambient light conditions (such as at dusk or night time) so that first imager 50 can distinctly image roadway mark section 30*a* including edges 30*b* and 30*c*.

Another floodlight 61 (see FIG. 11) may be positioned above second imager 60 and affixed to right side panel 14. Floodlight 61 correspondingly illuminates area 65 in low ambient light conditions (such as at dusk or night time). Power to both floodlights 51 and 61 may be provided via power cables 51*a* and 61*a* (power cable 61*a* is not shown), and the on/off state for each floodlight 51, 61 is electrically controlled by conventional mechanisms. When floodlights 51 and 61 are turned on, image areas 55 and 65 are respectively illuminated.

Also shown in FIG. 8 is a retroreflectometer 81. Retroreflectometer 81 is a device capable of measuring the retroreflectivity of materials, for example, by measuring retroreflected light and retroreflective surfaces. Retroreflectivity is an optical phenomenon, well known to one of ordinary skill in the art, in which reflected rays of light are returned in directions close to the opposite of the direction from which the light originated. Retroreflectometer 81 may be positioned below first imager 50 and affixed to left side panel 12 by conventional mechanisms. Retroreflectometer 81 measures the retroreflection of roadway mark section 30*a* and is calibrated to yield accurate and equivalent 30-meter geometry, or any other applicable industry standard, retroreflection measurements. Another retroreflectometer 91 (see FIG. 11) may be positioned below second imager 60 and affixed to the right side panel 14 by conventional mechanisms. Retroreflectometer 91 provides calibrated retroreflection measurements of roadway mark section 25*a*, for example.

Data and control signals communicate with retroreflectometer 81 via flexible cable 88. Cable 88 also includes power cables to supply the necessary electrical power to retroreflectometer 81. A similar cable 98 (not shown) provides data and control signal communication and electrical power to retroreflectometer 91.

The relative position of imaging sensor 70 with respect to GPS antenna 510 is assumed known by conventional mechanisms (e.g., vectorial offsets are determined by conventional mechanisms). Therefore, the GPS position of imaging sensor 70 may be determined by one of ordinary skill in the art. In addition, the relative position of the imaging sensor within second imager 60 with respect to GPS antenna 510 is assumed known by conventional mechanisms, and likewise therefore, the GPS position of the imaging sensor within second imager 60 is known.

Imagers 50 and 60 are calibrated so that the relative location of an actual object within the angular field of view 85 on roadway top surface 17 can be determined with respect to imaging sensor 70. For example, the relative location of edge 30b of roadway mark 30 with respect to imaging sensor 70 can be determined. Dimensions of an actual object from its image can also be determined. Conventional camera calibration techniques are known in the art for calibrating imagers to yield accurate object dimensions, locations, and distances of objects to image sensors from images using conventional coordinate transformation algorithms.

Therefore, knowing the relative location of the object (e.g., mark 30) with respect to imaging sensor 70, and the relative location of imaging sensor 70 with respect to the GPS location of GPS antenna 510, allows for the determination of the absolute GPS geographical position of an imaged object (or parts thereof) on roadway top surface 17, such as a roadway mark. Further, the length and width dimensions of the actual object imaged onto imaging sensor 17 can also be determined, such as the length and width dimensions of section 30a of roadway mark 30. It is therefore understood that every image pixel has an associated absolute GPS geographical position. For example, all four corners of the image of area 55 have an associated absolute GPS geographical position which corresponds to the actual corners of area 55.

The instant GPS location of any object within the angular field of view 85 of a calibrated first imager 50 is determined assuming that the GPS location data are instantly available when the image from calibrated first imager 50 is acquired. The GPS location of any object within the field of view of a calibrated second imager 60 is also instantly determined in a similar fashion. If the GPS location data are not instantly known when the images from imagers 50 and 60 are acquired because of GPS receiver latency or for other reasons, positional interpolation based upon the known time the images were captured is required.

Figure 9A:
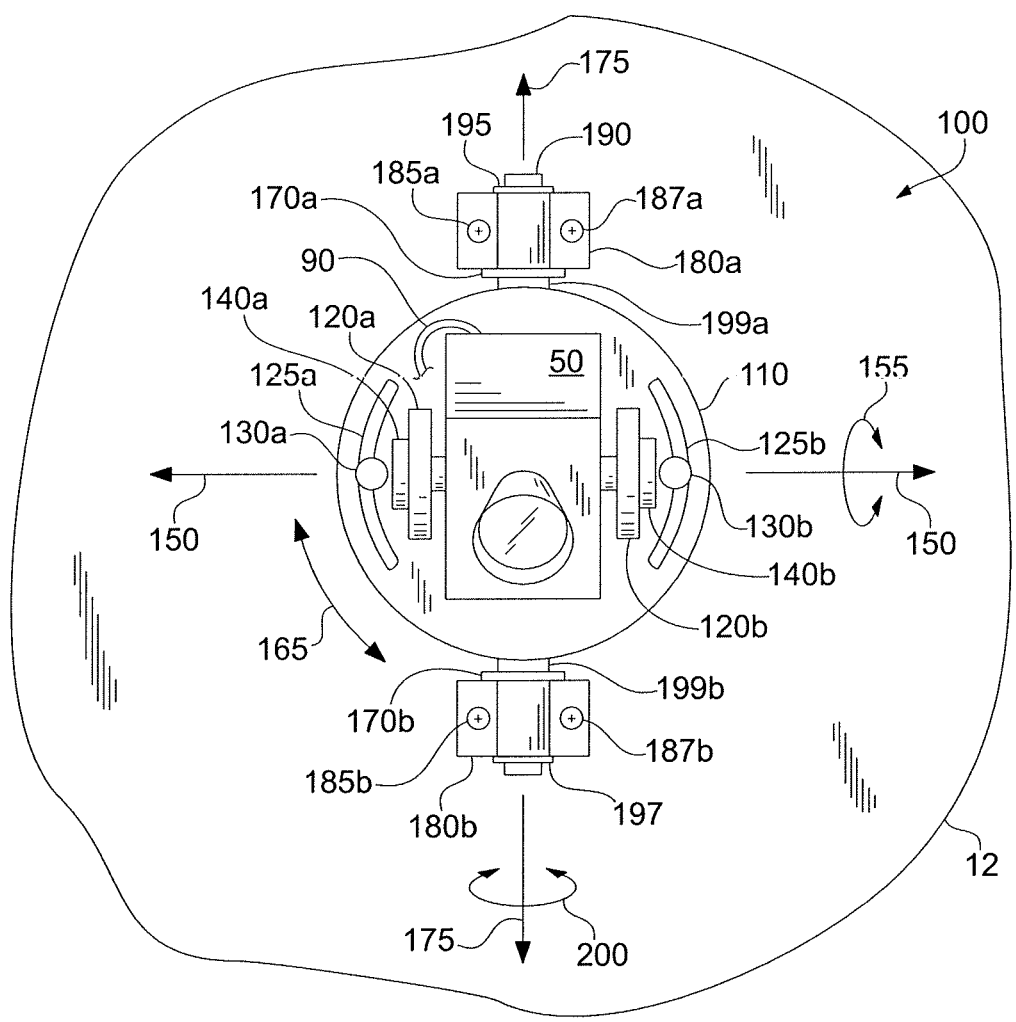
FIG. 9a is a front view of the adjustable imager mount.
Figure 9B:
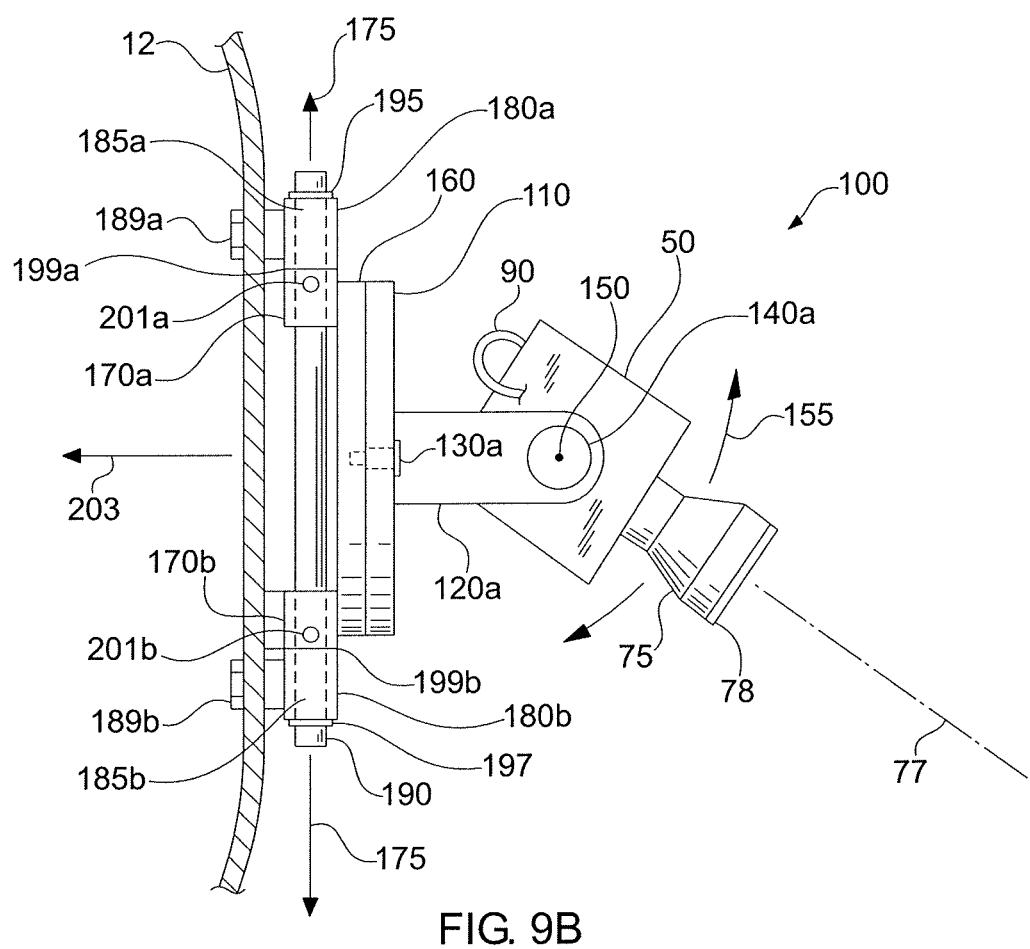

Referring now to FIGS. 9a and 9b, first imager 50 may be mounted to vehicle left side panel 12 with an adjustable angular mount 100. Angular mount 100 includes cylindrically shaped rotatable mounting plate 110 having fixed imager support brackets 120a and 120b. Brackets 120a and 120b extend outwardly from the surface of rotatable mounting plate 110, and are affixed to rotatable mounting plate 110 using conventional attachment mechanisms such as screws, or they may be welded into place (not shown).

Rotatable mounting plate 110 additionally has through slots 125a and 125b formed to accept shoulder screws 130a and 130b. First imager 50 is positioned between brackets 120a and 120b and is held in place with conventional rotatable mounts 140a and 140b, such that first imager 50 is rotatable around an axis 150 as indicated by rotational arrows 155. First imager 50 is affixed to rotatable mounts 140a and 140b using conventional attachment mechanisms such as screws (not shown).

Rotatable mounting plate 110 is axially aligned with, and rotatably mounted to, a cylindrically shaped support plate 160. Rotatable mounting plate 110 is affixed to support plate 160 with shoulder screws 130a and 130b. Loosening screws 130a and 130b allows rotatable mounting plate 110 to rotate around an axis 203 as indicated by rotational arrows 165.

Tightening screws 130a and 130b affixes rotatable mounting plate 110 to support plate 160 and prevents rotation of rotatable mounting plate 110 with respect to support plate 160.

Support plate 160 has further affixed on its surface facing vehicle left side panel 12 two conventional bearings 170a and 170b. Bearings 170a and 170b are aligned along an axis 175 and are affixed to support plate 160 using conventional mechanisms such as screws (not shown). Bearings 170a and 170b also have through set screws 201a and 201b.

Affixed to vehicle side panel 12 are two conventional shaft support brackets 180a and 180b. Conventional machine screws 185a, 187a, 185b, and 187b and respective nuts 189a, 189b, 189c (not shown), and 189d (not shown) are used to affix shaft support brackets 180a and 180b to vehicle side panel 12.

Support brackets 180a and 180b, and bearings 170a and 170b, are all aligned along axis 175. A shaft 190 (preferably stainless steel) is inserted through bearings 170a and 170b, and support brackets 180a and 180b, and is affixed to shaft support brackets 180a and 180b by conventional clamps 195 and 197, respectively.

Washers 199a and 199b minimize the frictional contact between the upper outer face of bearing 170a and the bottom outer face of support bracket 180a, and the bottom outer face of bearing 170b and the upper outer face of support bracket 180b, respectively.

Support plate 160 is prevented from rotating around shaft 190 by tightening set screws 201a and 201b. Thus, support plate 160 is able to fixedly rotate about axis 175 as indicated by rotational arrow 200.

Adjustable angular mount 100 provides for three adjustable orthogonal rotations for first imager 50 around axes 150, 175, and 203. First imager 50 can therefore be mounted on a contoured side panel 12 and subsequently aligned to image area 55 and then secured in this aligned position. In addition, adjustable angular mount 100 can be motorized and electronically controlled using a conventional motorized camera mount and externally controlled via a computer and joystick.

It is further understood that other equipment could be used to affix shaft support brackets 180a and 180b to vehicle side panel 12. For example, machine screws 185a, 187a, 185b, and 187b along with respective nuts 189a, 189b, 189c, and 189d could be replaced with other types of attachments for securing shaft support brackets 180a and 180b, and hence adjustable angular mount 100, to left side panel 12 of vehicle 1.

Figure 9C:
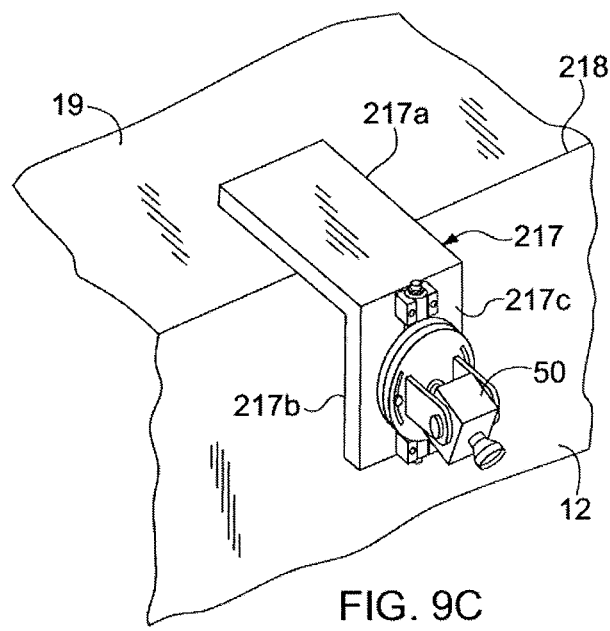
FIG. 9c is a perspective view of an L-shaped bracket used for affixing the adjustable imager mount to the roof of a vehicle.

Still referring to FIG. 9c, adjustable angular mount 100 may also be affixed to vehicle 1 (e.g., to the left side of roof 19 of vehicle 1) using a conventional L-shaped bracket 217. A leg 217a of bracket 217 is attached to roof 19 by a conventional mechanism (for example, by screws or welded into place, not shown). Leg 217a extends beyond a roof line 218 of vehicle 1. A leg 217b of bracket 217 is vertically positioned and provides an outside surface 217c for affixing shaft support brackets 180a and 180b, using conventional attachment mechanisms.

Figure 10:
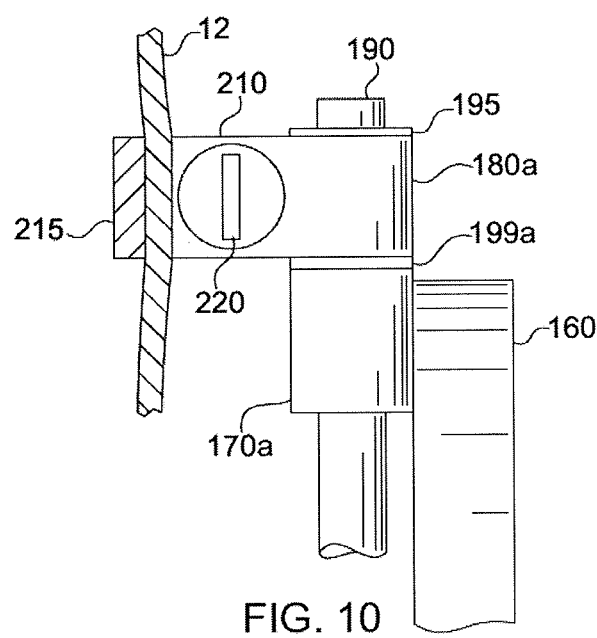
FIG. 10 is a side view of a magnetic clamp for affixing the imager mount to the side of a vehicle.

Referring now to FIG. 10, an example of another mechanism for attaching adjustable angular mount 100 to left side panel 12 is shown. The mechanism includes a conventional releasable magnetic clamp 210 affixed to shaft support bracket 180a. A turning switch 220 directs the magnetic field of magnetic clamp 210 to forcibly attract magnetic clamp 210 to the ferromagnetic metallic vehicle left side panel 12. If the side panel 12 of vehicle 1 is constructed of non-ferromagnetic material, a ferromagnetic strip 215 placed on the inside surface of side panel 12 and oppositely aligned with magnetic clamp 210 is used in combination with the magnetic field of magnetic clamp 210 to affix support bracket 180a. Another magnetic clamp 216 (not shown) is similarly affixed to shaft support bracket 180b. In addition, ferromagnetic strip 215 could also be placed behind window glass of vehicle 1 allowing magnetic clamp 210 to fix adjustable angular mount 100 to the glass surface.

Suction cups could also be used in place of releasable magnetic clamps 210, 216, and are especially advantageous for affixing adjustable angular mount 100 to side window glass. Also, a combination of one magnetic clamp (for affixing to a metallic side of vehicle 1) and one suction cup (for affixing to glass) could be used to affix adjustable angular mount 100. Suction cups could also be used to affix adjustable angular mount 100 on smooth surfaces. A combination of ferromagnetic material and magnetic clamp 210 along with suction cups could also be used to affix adjustable angular mount 100 to side panel 12. It is noted that bracket 217 may also be affixed to roof 19 using one or more magnetic clamps similar in construction to clamp 210, or one or more suction cups, or a combination thereof, in place of the conventional attachment mechanisms.

It is also understood second imager 60 is affixed to right side panel 14 or on the right side of roof 19 of vehicle 1 using similarly constructed mounts (not shown).

Referring now to FIG. 11, a schematic block diagram 500 of a preferred embodiment is shown. The embodiment includes a number of components and systems: GPS antenna 510, GPS receiver 22, programmable synchronization circuit 530, first imager 50, lens element 75, aperture 76, floodlight 51, second imager 60, lens element 95, aperture 96, floodlight 61, a bi-directional communication bus 540, a display 550, a keyboard 560, a joystick 570, a computer 580, a vehicle speed detector 545, retroreflectometers 81 and 91, and a power supply 590 (e.g., battery operated).

GPS receiver 22, synchronization circuit 530, imagers 50 and 60, lens elements 75 and 95, apertures 76 and 96, speed detector 545, floodlights 51 and 61, retroreflectometers 81 and 91, and computer 580 are electrically interconnected, and in communication with each other, for example, via bi-directional bus 540.

Computer 580 is a conventional computer having an image acquisition system 582 for controlling and triggering imagers 50 and 60, and a real-time clock for calculating accurate time intervals (not shown).

In addition, keyboard 560 connects to computer 580 via a dedicated bi-directional connection 561 and provides a way for a user to input data into computer 580. Display 550 connects to computer 580 via dedicated bi-directional bus 551 and provides the user with a visualization of mark images generated by computer 580 and visually displays other information to the user. Joystick 570 connects to computer 580 via a wired connection 571 and is used to control a motorized adjustable angular mount 100.

Display 550, keyboard 560, and joystick 570 are conventional computer peripherals. A conventional mouse is also connected to computer 580 via a cable (not shown). Keyboard 560, display 550, joystick 570, and the mouse could also communicate with computer 580 via a wireless connection or a combination of cable and wireless connections, or connect directly to bus 540 for communicating with computer 580.

GPS antenna 510 receives GPS radio waves or signals 505 which originate from a remote GPS satellite system and/or a GPS-pseudolite array. GPS antenna 510 is conductively connected to the input of GPS receiver 22. Radio waves 505 could also include real time kinematic (RTK) service provider signals (not shown). RTK satellite navigation is a technique used to enhance the precision of position data derived from satellite-based positioning systems. The technique can be used in conjunction with GPS, GLONASS, and/or Galileo. It uses measurements of the phase of the signal's carrier wave, rather than the information content of the signal, and relies on a single reference station to provide real-time corrections, providing up to centimeter-level accuracy. With reference to GPS in particular, the system is commonly referred to as Carrier-Phase Enhancement, or CPGPS.

GPS receiver 22 determines the time and geographical location 507 of antenna 510 at a periodic rate programmed by computer 580, or receiver 22 can be polled by computer 580 for positional and time information. Positional and time information from GPS receiver 22 is placed onto bus 540.

Figure 12:
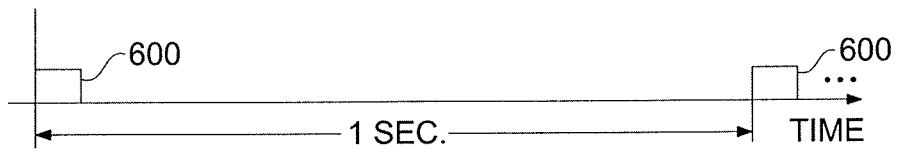
FIG. 12 is a timing diagram illustrating a periodic GPS receiver timing pulse.

Referring to FIG. 12, GPS receiver 22 also outputs a periodic pulse signal 600 onto line 594 which flows to an input connection of synchronization circuit 530. The time of occurrence of periodic pulse signal 600 is accurately known. For example, the Trimble GPS receiver model number BD982 provides a one pulse per second (1 pps) signal 600 with a corresponding ASCII formatted Universal Time Coordinated (UTC) time tag (i.e., the exact time of pulse occurrence).

Figure 13:
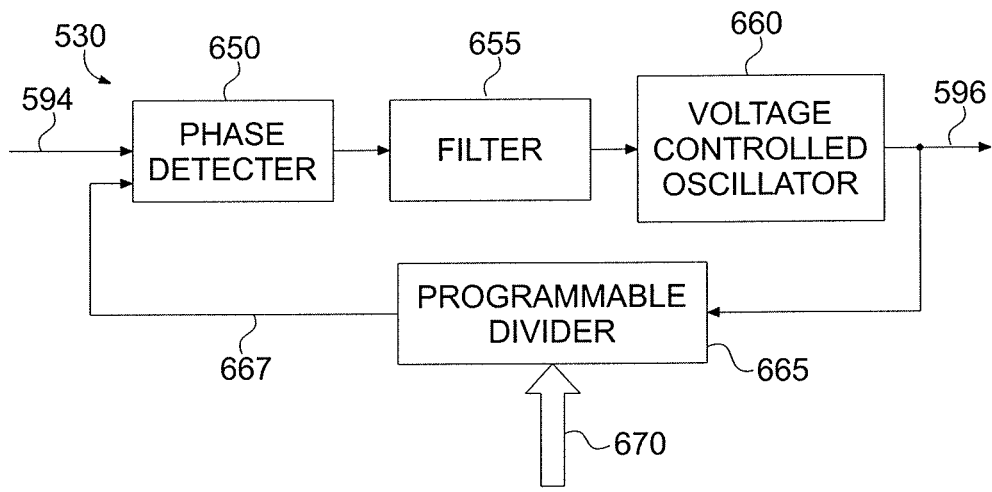
FIG. 13 is a block diagram of a phase lock loop having a programmable divider inserted into the phase lock loop feedback signal path.

Referring to FIG. 13, synchronization circuit 530 comprises a conventional phase lock loop circuit (having a phase detector 650, a low pass filter 655, and a voltage controlled oscillator 660) and a programmable divider circuit 665 inserted into the phase lock loop feedback path 667.

Programmable divider 665 is programmed to divide signal 600 placed onto line 594 by an integer number represented by a binary digital signal 670 input from bus 540. Signal 670 is placed onto bus 540 by computer 580. The output signal from the voltage controlled oscillator 660 is placed onto a line 596 which then flows via bus 540 to the trigger input of image acquisition system 582 contained within computer 580.

Figure 14:
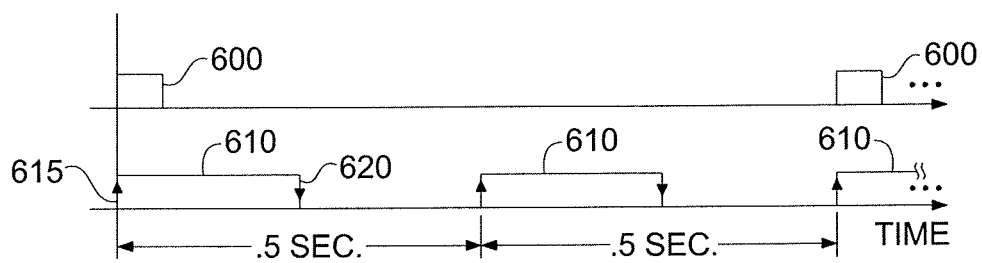
FIG. 14 is a timing diagram illustrating a periodic GPS receiver timing pulse and synchronization circuit output.

For example and referring now to FIG. 14, an eight-bit programmable divider (divide by N counter) 665 programmed with binary digital signal "00000010" (which represents a divider integer value of 2) causes programmable divider 665 to divide signal 600 by 2. This produces a periodic signal 610 which is twice the frequency of signal 600. For example, for a one pulse per second signal 600 and a divide by 2 integer value programmed into programmable divider 665 a periodic signal 610 is produced having a frequency of 2 pulses per second (period equals 0.5 seconds) which will be output from voltage controlled oscillator 660 and placed onto line 596.

The phase lock loop also maintains excellent frequency tracking to strobe periodic pulse signal 600. Thus knowing the time of occurrence of signal 600 and the divider integer defines the exact time of when the rising edge 615 of periodic pulse signal 610 occurs. Thus, synchronization circuit 530 can be programmed via computer 580 for producing periodic signals 610 having an equal or higher frequency as, and synchronized with, signal 600.

An example of a phase lock loop is a 74HC4046 integrated circuit. The phase lock loop function can also be implemented in software, or a combination of software and hardware.

In response to trigger signal 610, image acquisition system 582 simultaneously triggers imagers 50 and 60 to capture images of areas 55 and 65, respectively. Captured images of areas 55 and 65 are then subsequently stored in a computer data memory 720 (see FIG. 15). As discussed below, along with each captured image are an image index number, time, and an interpolated GPS geographical position. It is assumed that the imagers 50 and 60 are triggered on the rising edge 615 of signal 610, although imagers 50 and 60 could also be triggered on the falling edge 620 of signal 610.

Triggering imagers 50 and 60 at an equal or higher frequency than the frequency of signal 600 provides for one or multiple images 55 and 65 of roadway surfaces for every pulse 600. As an example, having computer 580 program divider circuit 665 with an equivalent integer value of 2 results in synchronization circuit 530 producing a triggering signal 610 which is twice the frequency of signal 600 as shown in FIG. 14.

Speed detector 545 determines the speed of vehicle 1 which may be determined by conventional mechanisms such as an electronic speedometer. The speed of vehicle 1 may also be determined by computer 580 from the known distance travelled using GPS coordinates and the time it takes for vehicle 1 to travel the known distance.

Battery operated power supply 590 provides electrical power to all block diagram 500 components via a power bus 592 and is preferably operated from an internal battery (not shown) of the vehicle 1. Power supply 590 may provide both AC and DC power.

Figure 15:
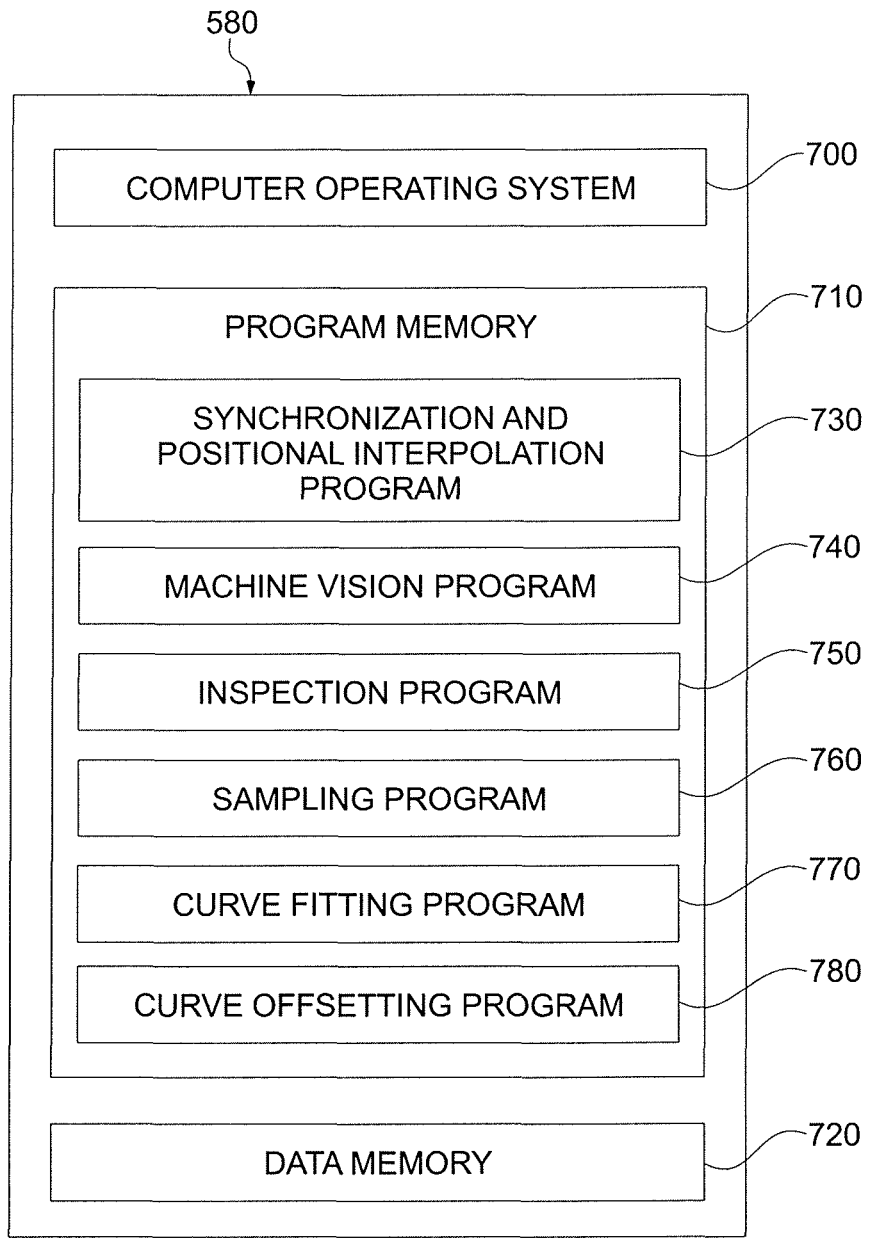
FIG. 15 is a block diagram illustrating a computer used in the present invention, which includes a computer operating system, program memory, and data memory.

Referring now to FIG. 15, computer 580 further includes a computer operating system software 700, program memory 710, and data memory 720. Operating software 700 is a conventional operating system (OS) such as Windows 7 manufactured by Microsoft, a Unix-based OS, or an Apple Computer OS system. Data memory 720 is a conventional computer read-write memory. For example, data memory 720 could include separately or in combination conventional solid state drive(s), high-speed hard disk drive(s), and/or random access memory (RAM). Program memory 710 comprises a synchronization and positional interpolation program 730, a machine vision program 740, an inspection program 750, a sampling program 760, a curve fitting program 770, and a curve offsetting program 780.

Synchronization and positional interpolation program 730 corrects for time latency in GPS receiver 22 (discussed below and with reference to FIG. 16) and therefore determines the accurate GPS geographical position for each captured image. In addition, synchronization and positional interpolation program 730 determines the GPS derived time-tag and provides a sequential image index number for each captured image. These data are then stored into data memory 720.

Figure 16:
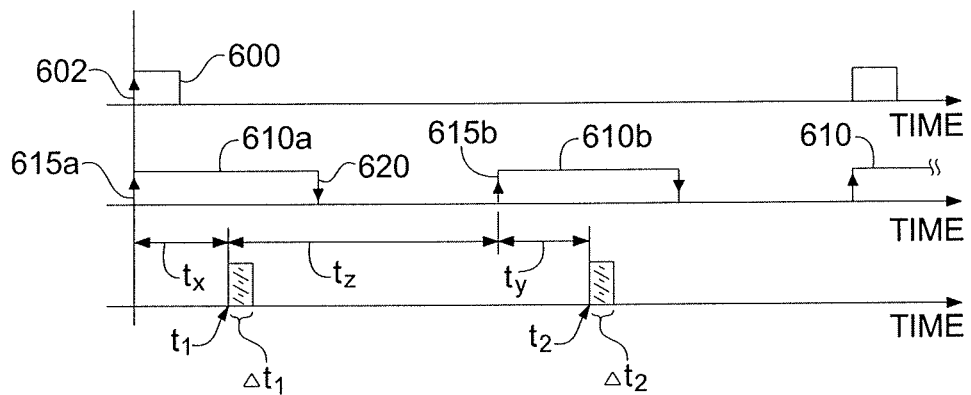
FIG. 16 is a timing diagram showing GPS receiver time latency.

Referring now to FIG. 16, periodic pulse signal 600 along with synchronized periodic signal 610 is shown. The rising edges (first two rising edges 615a and 615b are shown) of synchronized periodic signal 610 (the first two pulses are indicated as 610a and 610b) are used to trigger image acquisition system 582 thereby acquiring images of areas 55 and 65 from imagers 50 and 60, respectively. At instant time t1 GPS receiver 22 acquires GPS geographical positional and GPS time data. These data are available during time interval Δt1 after the positional and time data are acquired at instant time t1. Instant time t1 could occur at the rising edge 602 of periodic pulse signal 600 and would therefore be synchronized to periodic pulse signal 600, or it could be delayed by time interval tx from rising edge 602 of periodic pulse signal 600. The time interval Δt1 is defined as the time latency which occurs because GPS receiver 22 needs calculation time to compute the GPS time and GPS geographical location values from satellite signals 505, or for other reasons.

Likewise, at instant time t2 GPS receiver 22 acquires GPS geographical positional and GPS time data. Instant time t2 could be delayed by time interval ty from rising edge 615b of trigger signal pulses 610b. The time interval Δt2 is defined as the time latency associated with instant time t2. These data are available during time interval Δt2 after the positional and time data are acquired at instant time t2. Instant time t2 could occur at a preset time interval after t1, or instant times t2 and t1 could occur periodically. In either case, there is a possibility that image trigger signal pulses 610a and 610b are not synchronized with instant time t1 or instant time t2, and therefore the exact GPS geographical position of the image is not known within a high degree of positional accuracy.

Accurate GPS coordinates for the images of areas 55 and 65 from imagers 50 and 60, respectively, are determined at rising edge 615b by first determining the time interval (t2−t1) and the GPS geographical positional difference (or equivalent positional differences in ENU coordinates). Knowing the UTC time-tag of rising edge 615b of pulse 610b yields the time interval tz. Knowing tz and the time interval (t2−t1), a simple linear interpolation is used to determine the GPS geographical position of the images which are triggered by rising edge 615b.

The GPS location of images triggered by rising edge 615b equals the time interval tz divided by the time interval (t2−t1) times the geographical positional difference corresponding to times t2 and t1, plus the geographical position at t1. This process is repeated for subsequent images.

Figure 17:
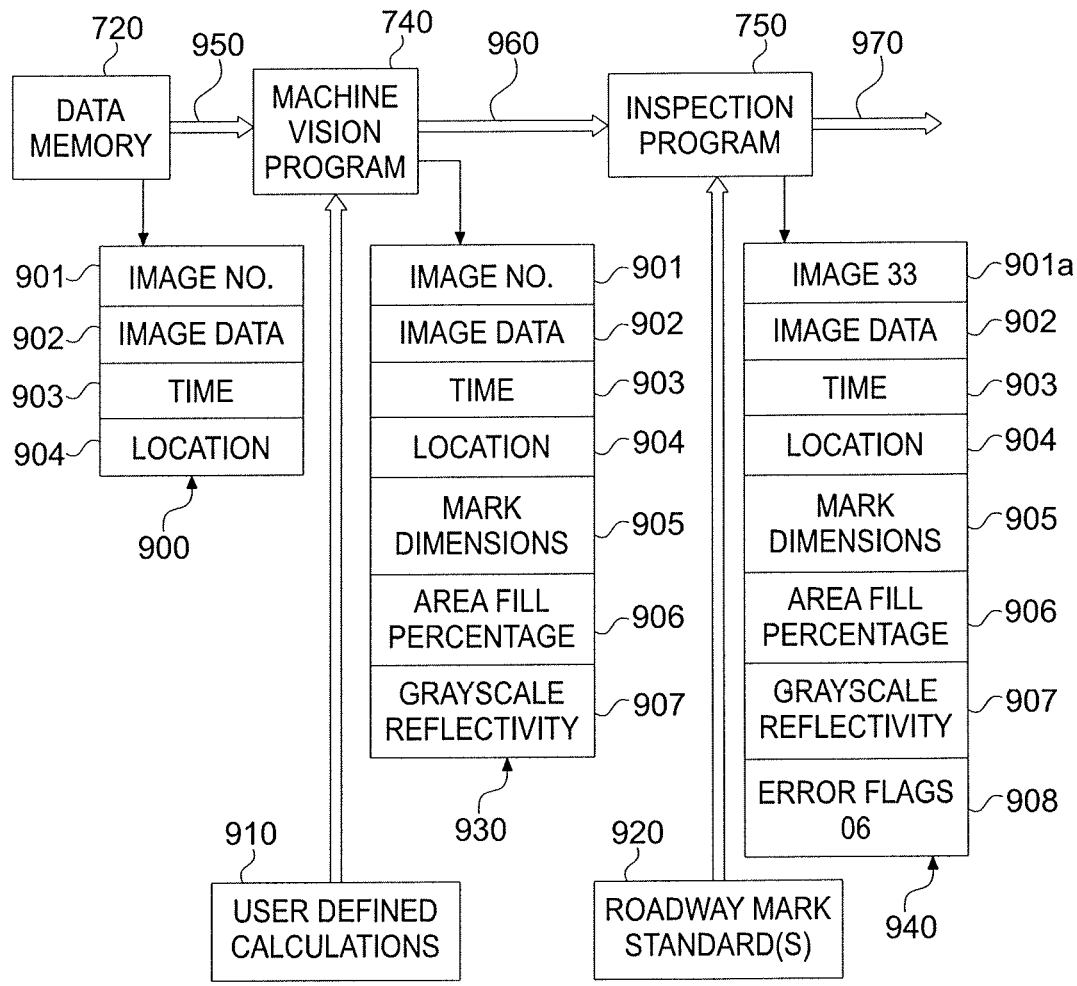
FIG. 17 is a schematic block diagram showing the data input and data output of the machine vision and inspection programs.

Referring to FIG. 17, each triggered image from imagers 50 and 60 therefore has a data block 900. Data block 900 includes an associated image index number 901 sequentially identifying the captured images, the actual captured image data 902 of the roadway area (which may or may not include a roadway mark), a GPS derived time-tag 903 (i.e., the time the images were acquired), and an associated accurate GPS geographical location 904—all of which are stored in data memory 720 by synchronization and positional interpolation program 730. Data block 900 is then passed to machine vision program 740 as indicated by arrow 950.

Machine vision program 740 includes a number of machine vision algorithms which are selected by the user-defined calculations input 910 to perform desired calculations on image data 902. The calculations may include, for example, edge detection, geometric computations and distance computations of imaged objects, and other generic machine vision calculations. For example, machine vision program 740 includes algorithms which the user selects by user-defined calculations input 910 to determine the roadway mark edges within the field of view of imagers 50 and 60 (for example edges 30b and 30c); the actual width and length dimensions and the absolute GPS location of the roadway mark from the roadway mark image; and other roadway mark characteristics such as the area of the roadway mark.

Machine vision program 740 also includes algorithms which the user may select using user-defined calculations input 910 to determine, using the grayscale values of the acquired images, the reflectivity of the roadway mark, the reflectivity of the surrounding roadway surface, and the relative difference between the reflectivity of the roadway mark and reflectivity of the surrounding roadway surface. Grayscale images may include images where the value of each pixel is a single value which will ultimately be interpreted by some rendering platform as values (such as intensities) to be displayed (or analyzed). Displayed images of this sort are typically composed of shades of gray (hence the moniker "grayscale") although any color (or, indeed, different colors) can serve in this regard. For any particular grayscale standard, there is a given available range of grayscale level values. For example, a given grayscale standard might represent a range of black at the weakest intensity to white at the strongest intensity. Thus, for example, an image of section 30a of roadway mark 30 may have a value of 220 (very "white") based upon a grayscale value of 0-255 (assuming an 8-bit intensity quantization), while the surrounding roadway surface (such as asphalt-macadam) may have a value of 20 (very "black"), yielding a grayscale contrast difference of 200 between roadway mark section 30a and the surrounding roadway surface.

Machine vision program 740 also includes algorithms to compare the grayscale values of the images of the roadway and roadway mark with a predetermined threshold value. If the grayscale values are below this predetermined threshold value, machine vision program 740 turns on floodlights 51 and 61 to better image the roadway and roadway marks under low ambient light conditions.

Other roadway mark characteristics include the reflectivity of the roadway mark 20, 25, 30, the reflectivity of the surrounding roadway top surface 17, and the relative difference between the reflectivity of the roadway mark 20, 25, 30 and the reflectivity of the surrounding roadway top surface 17. As used in this document, "reflectivity" may refer to the fraction of incident light that is reflected by the surface (e.g., the roadway mark 20, 25, 30 or the roadway top surface 17).

Machine vision program 740 further includes algorithms which may also be selected by user-defined calculations input 910 to determine the area "fill percentage" using the grayscale values of the roadway mark. For example, the "fill percentage" may be defined as: t,?
In other words, the fill percentage may be based on the relationship between the portion of the mark 20, 25, 30 that is not filled (e.g., without paint) as compared to the total area of the mark 20, 25, 30 that should be completely filled (e.g., defined by the outer perimeter of the intended or original mark 20, 25, 30).

Figure 18A:
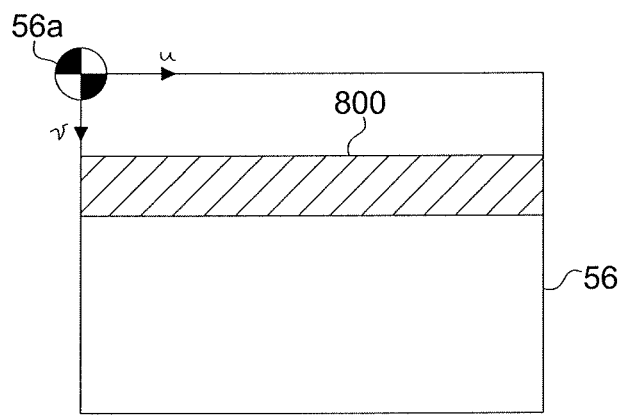
FIG. 18a is an image of a roadway mark having 100% area fill.
Figure 18B:
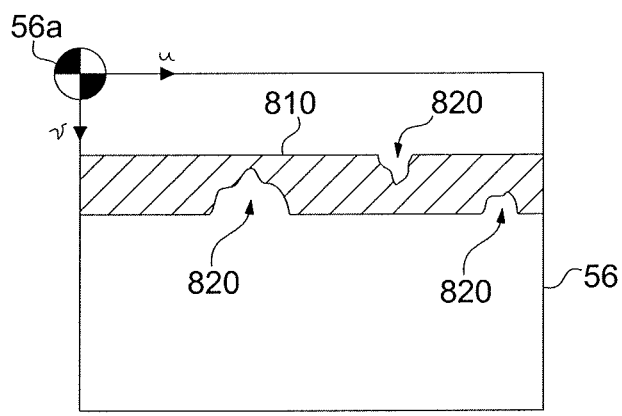
FIG. 18b is an image of a roadway mark having less than 100% area fill.

For example, FIG. 18a illustrates an image 56 of area 55 having an imaged roadway mark segment 800 having an imaged roadway mark area fill percentage of 100%. FIG. 18b illustrates an image 56 of area 55 having an imaged roadway mark segment 810 with partially worn-away portions 820 and having an imaged roadway mark area fill percentage of less than 100%.

Machine vision program 740 additionally includes algorithms to define the equivalent absolute GPS coordinates of the corners of the image (and hence the absolute GPS coordinates of the corners of area 55). For example, in FIG. 18a the absolute GPS coordinates of the upper left hand corner of image 56 is determined and an image corner referenced coordinate system 56a having image axes u-v can be defined.

Machine vision program 740 additionally includes algorithms which may also be selected by user-defined calculations input 910 to compute the lateral distances (i.e., in the y direction of coordinate system 16) between roadway marks and can determine, for example, the width of lane 11a and/or the lateral spacing between double roadway marks, or the widths of the roadway marks. Machine vision program 740 may also be programmed by user calculations input 910 to input retroreflection data from retroreflectors 81 and 91.

Machine vision program 740 subsequently expands the original data block 900 to now include the desired user-defined calculations 910 in addition to the original data contained within data block 900. For example, data block 900 is now expanded to include roadway mark dimensions 905 (for example, roadway mark width and length), area fill percentage 906, and grayscale reflectivity values 907, all of which are now grouped within a data block 930 and subsequently stored in data memory 720. If retroreflection data are required, data block 930 is further expanded to include retroreflection data. Other data may be included in data block 930, such as lane width etc. Data block 930 can be further stored in memory 720.

Figure 19:
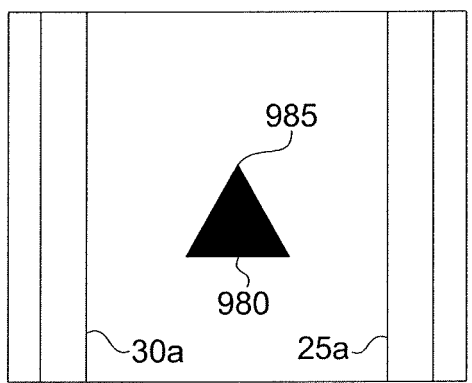
FIG. 19 illustrates the computer display showing an image of the roadway center and edge marks along with an arrow representing the vehicle location relative to the two marks.

Referring to FIG. 19, machine vision program 740 also combines the captured images from imagers 50 and 60 and outputs merged image 990 to display 550 via computer 580 using the absolute GPS coordinates of the roadway marks and the location of GPS antenna 510 with respect to the center of vehicle 1. Positional offsets between GPS antenna 510 and imagers 50 and 60 have been previously determined by conventional mechanisms.

The merged image 990 consists, for example, of roadway mark 30 imaged section 30a and roadway mark 25 imaged section 25a with vehicle 1 being represented as a triangle 980 having a tip 985 indicating the direction of travel of vehicle 1. As vehicle 1 moves laterally between sections 30a and 25a, triangle 980 likewise laterally moves between imaged sections 30a and 25a. Merged image 990 correctly represents the lateral distance between sections 30a and 25a with respect to the lateral location of vehicle 1.

Data block 930 is then passed to inspection program 750 as indicated by an arrow 960.

Inspection program 750 inputs both data block 930 and user-defined roadway mark standards data 920, and further performs a comparison between the data stored in data block 930 and roadway mark standards data 920. Any roadway mark which does not meet the defined roadway mark standards data 920 is flagged with a code and stored in error flags section 908 of a data block 940.

For example, data block 940 is shown as the output of inspection program 750 having the image index number 901a as number "33." Appended to data block 930 is error flags section 908. Stored within error flags section 908 is the error flag "06," which indicates that the roadway mark derived from image 33 did not meet, for example, the roadway mark width standard. All data which fail the comparison between the data stored in data block 930 and the roadway mark standards data 920 are stored in data memory 720 as indicated by an arrow 970 for later analysis and remedial work.

Sampling program 760 receives a GPS reference location from GPS receiver 22 and constructs an orthogonal Cartesian (or other conventional) coordinate system (grid system) having the origin defined at the reference location. For example, Cartesian coordinate system 16 could be a conventional ENU coordinate system. Sampling program 760 samples the geographical location of the pre-existing roadway mark based upon either a distance or time sampling interval. The distance sampling interval can be determined by computer 580 from the GPS coordinates of GPS antenna 510 computed by GPS receiver 22. The time sampling interval can be determined either from the internal time base of computer 580 or from GPS time computed by GPS receiver 22, or other time bases.

Curve fitting program 770 inputs discrete GPS coordinate data previously stored in data memory 720 and determines a first continuous mathematical function which best fits the discrete GPS coordinate data. Curve offsetting program 780 inputs the continuous function determined by curve fitting program 770 and generates a second continuous function similar and parallel to the first function but offset from the first function by a given distance. For example, the first function may represent the roadway mark 30 on roadway 2. A second function defining a line for roadway edge mark 25 may be derived from the first function by offsetting the first function by a distance, or the first function may represent a roadway edge mark 20 and the roadway mark 30 may be derived from the first function by offsetting the first function by a distance.

In operation, the operator of vehicle 1 inputs the desired user-defined calculations 910 using keyboard 560 and begins to travel on roadway 2 maintaining vehicle 1 within lane 11a defined by roadway demarcation marks, for example, center mark 30 and roadway side mark 25. It is assumed at this point that power supply 590 is turned on and supplying power via bus 592 to the respective components discussed above. With power applied via bus 592, all components begin operating. In response to supplied power, GPS receiver 22 begins to input signals 505 from GPS antenna 510 and starts to calculate GPS geographical location 507 and time-tag information. GPS receiver 22 also generates periodic pulse signal 600 which flows onto line 594 to synchronization circuit 530.

At a chosen position for beginning to inspect the left and/or right side roadway marks and/or determine the geographical location of the pre-existing roadway marks, the user depresses a "Start" key on keyboard 560 which communicates this key selection to computer 580 via connection 561. Computer 580 then inputs speed data of vehicle 1 from speed detector 545 (or alternatively uses the differences in vehicle GPS position and time data from GPS receiver 22 to compute vehicle speed).

In response to the speed of vehicle 1, computer 580 programs programmable divider circuit 665 of synchronization circuit 530 via signals 670 placed onto bus 540. In response to programmed divider circuit 665, synchronization circuit 530 outputs periodic signal 610 onto line 596 which flows via bus 540 to image acquisition system 582 contained within computer 580. In response to periodic signal 610, image acquisition system 582 triggers imagers 50 and 60 to capture roadway mark areas 55 and 65, respectively.

In response to the speed of vehicle 1, programmed divider circuit 665 insures that the frequency of the trigger periodic signal 610 is sufficient to trigger imagers 50 and 60 at a rate to acquire overlapping images so that a continuous image of the roadway mark path is obtained so that there are no missing sections of the roadway mark.

It is further noted that by having the frequency of image-triggering periodic signal 610 programmable and dependent upon the speed of vehicle 1 insures that efficient use of data memory 720 occurs when storing image data. For example, vehicle 1 may be stopped at a traffic light or experience significant variations in vehicle speed as might occur in stop-and-go traffic. Adjusting the frequency of image-triggering periodic signal 610 as a function of the speed of vehicle 1 insures that at lower vehicle speeds fewer roadway images are taken while at higher vehicle speeds many more roadway images are taken while still maintaining sufficient image overlap so that there are no missing sections of the roadway mark and the complete and entire roadway mark and mark path has been imaged.

Synchronization and positional interpolation program 730 corrects the positional data of each roadway image using GPS receiver 22 data to insure the accurate geographical position for each roadway image, sequentially numbers each captured image with an image index number 901, and then stores the index number 901, captured image data 902, time of image acquisition 903, and the GPS location of the roadway image 904 (for example, the GPS location of the origin of coordinate system 101a in FIG. 28) as a data block 900 into data memory 720. Image filtering program 735 then crops the image data 902 forming filtered image data 902a (for example, cropped image 176 in FIG. 28). Program 735 calculates a coordinate offset 909 and forms data block 915.

Machine vision program 740 then inputs the images stored in data block 900 format indicted by arrow 950, performs geometric calculations and determines the width and length of the roadway mark, grayscale reflectivity, fill percentages, and other roadway mark characteristics as defined by user-defined calculations input 910. The original data stored in data block 900 for each image are now expanded to include mark dimensions 905, area fill percentage 906, and grayscale reflectivity values 907 and any other user-defined calculations input 910 forming data block 930. Data block 930 may also be stored in memory 720. In addition, machine vision program 740 displays merged image 990 which is subsequently viewed by the operator.

Inspection program 750 inputs data block 930 as indicated by arrow 960 and also inputs user-defined roadway mark standards data 920. Inspection program 750 then compares the data contained within data block 930 with the corresponding data contained within roadway mark standards data 920. Any roadway mark not meeting the desired standards is flagged and saved to data memory 720 as indicated by arrow 970.

Sampling program 760 then samples the geographical position of the imaged roadway mark. Curve fitting program 770 inputs the sampled GPS coordinate data previously stored in data memory 720 and determines a first continuous mathematical function which best fits the discrete GPS coordinate data. Curve offsetting program 780 inputs the continuous function determined by curve fitting program 770 and generates a second continuous function similar and parallel to the first function but offset from the first function by a given distance. For example, the first function may represent the roadway mark 30 on roadway 2. A second function defining a line for roadway edge mark 25 may be derived from the first function by offsetting the first function by a distance, or the first function may represent roadway edge mark 20 and roadway mark 30 may be derived from the first function by offsetting the first function by a distance.

The continuous function(s) determined by curve fitting program 770 and/or curve offsetting program 780, along with roadway mark characteristics, are then used by a GPS roadway marker as previously described to replicate the original roadway mark 20, 25, 30 onto the repaved roadway top surface 17.

Thus, the geographical position of roadway marks 20, 25, 30 which do not meet the desired roadway mark standards can be identified and the GPS geographical position known and later used for remedial work. The roadway mark GPS geographical position can also be used to remark the repaved roadway top surface 17.

Although illustrated and described above with reference to certain specific embodiments, the present invention is nevertheless not intended to be limited to the details shown. Rather, various modifications may be made in the details within the scope and range of equivalents of the claims and without departing from the spirit of the invention. It is expressly intended, for example, that all ranges broadly recited in this document include within their scope all narrower ranges which fall within the broader ranges.

What is claimed:

1. An apparatus for determining a geographical location of a roadway mark from a moving vehicle, the apparatus comprising:
a GPS antenna mounted to a vehicle;
a GPS receiver responsive to the GPS antenna and configured to (a) determine a first time-tagged geographical location of the GPS antenna and a second time-tagged geographical location of the GPS antenna, and (b) generate a first periodic signal having a known time of occurrence and a first frequency;
a synchronization system responsive to the GPS receiver configured to generate a second periodic signal that (a) has a known time of occurrence, (b) is synchronized to the first periodic signal and (c) has a second frequency equal to an integer multiple of the first frequency;
a first imager mounted to the vehicle, wherein the first imager is (a) synchronously responsive to and triggered by the second periodic signal and (b) configured to image a first roadway mark to provide a first triggered roadway mark image; and a computer (a) responsive to the GPS receiver and the first imager and (b) configured to determine a GPS location of the first roadway mark using positional interpolation based on the first time-tagged geographical location, the second time-tagged geographical location, and the first triggered roadway mark image.

2. The apparatus according to claim 1 wherein:

the GPS antenna, is configured to receive GPS radio wave signals originating from a GPS satellite system or a GPS-pseudolite array, and the GPS receiver is configured to receive the GPS radio wave signals from the GPS antenna and decode the GPS signals to determine the first time-tagged geographical location of the GPS antenna and the second time-tagged geographical location of the GPS antenna.

3. A method for determining a geographical location of a roadway mark from a moving vehicle, comprising:

determining with a GPS receiver a first time-tagged geographical location of a GPS antenna mounted to a vehicle and a second time-tagged geographical location of the GPS antenna;

generating a first periodic signal using the GPS receiver, the first periodic signal having a known time of occurrence and a first frequency;

generating a second periodic signal using a synchronization system responsive to the GPS receiver, the second periodic signal (a) having a known time of occurrence, (b) synchronized to the first periodic signal and (c) having a second frequency equal to an integer multiple of the first frequency;

imaging a first roadway mark using a first imager mounted to the vehicle to produce a first triggered roadway mark image, wherein the first imager is synchronously responsive to and triggered by the second periodic signal; and using a computer to determine a GPS location of the first roadway mark using positional interpolation based on the first time-tagged geographical location and the second time-tagged geographical location.

4. The method according to claim 3, wherein the computer determines the GPS location of the first triggered roadway mark using positional interpolation based on the first time-tagged geographical location, the second time-tagged geographical location, and the known time of occurrence of the second signal.

5. The apparatus of claim 1, wherein the computer is further configured to (i) calculates roadway mark characteristics from the triggered roadway mark image and (ii) compares the calculated roadway mark characteristics against a standard set of roadway mark characteristics.

6. The apparatus according to claim 5, wherein the roadway mark characteristics are at least one of a width of the roadway mark, a length of the roadway mark, a grayscale reflectivity, retroreflectivity, and a fill percentage.

7. The apparatus according to claim 1, wherein the first imager is mounted to the vehicle using an adjustable mount including a fixably adjustable axis of rotation parallel to a roadway surface including the first roadway mark for aligning the first imager so that the first imager can focus on the roadway mark.

8. The method according to claim 3, further comprising using the computer to:

calculate roadway mark characteristics from the first roadway mark image; and compare the calculated roadway mark characteristics against a standard set of roadway mark characteristics.

9. The method according to claim 3 wherein the first imager is a charge coupled device camera.

10. The method according to claim 3, wherein the first imager is a calibrated imager.

11. An apparatus for locating and placing marks on a roadway, the apparatus comprising:

a GPS antenna mounted to a vehicle;

a GPS receiver responsive to the GPS antenna and configured to (a) determine a first time-tagged geographical location of the GPS antenna and a second time-tagged geographical location of the GPS antenna, and (b) generate a first periodic signal having a known time of occurrence and a first frequency;

a synchronization system responsive to the GPS receiver configured to generate a second periodic signal that (a) has a known time of occurrence, (b) is synchronized to the first periodic signal and (c) has a second frequency equal to an integer multiple of the first frequency;

a first imager mounted to the vehicle, wherein the first imager is (a) synchronously responsive to and triggered by the second periodic signal and (b) configured to image a first roadway mark on a roadway to provide a first triggered roadway image;

a computer (a) responsive to the GPS receiver and the first imager, and (b) configured to:

(1) determine a GPS location of the first roadway mark, and (2) determine a continuous smooth geographical location function best-fitted to the GPS location of the first roadway mark; and a marker responsive to the computer for replicating automatically the first roadway mark onto the roadway based on the continuous smooth geographical location function.

12. The apparatus according to claim 11, wherein the GPS antenna is configured to receive GPS radio wave signals originating from a GPS satellite system or a GPS-pseudolite array, and the GPS receiver is configured to receive the GPS radio wave signals from the GPS antenna and decode the GPS signals to determine the first time-tagged geographical location of the GPS antenna and the second time-tagged geographical location of the GPS antenna.

13. The apparatus according to claim 11 further comprising a second imager which images the roadway in front of the vehicle.

14. The apparatus according to claim 11 further comprising a speed detector and a nozzle array and control system, the speed detector informing the nozzle array and control system and enabling the nozzle array and control system to adjust the rate at which it places marking material onto the roadway.

15. The apparatus according to claim 11, wherein the computer generates an additional roadway mark function by offsetting the continuous function by an amount consistent with the desired position of a second roadway mark relative to the replicated roadway mark.

16. The method according to claim 3, wherein the synchronization system comprises a phase lock loop system.

17. The method according to claim 16, wherein the phase lock loop system comprises a computer software implemented phase lock loop system.

18. The method according to claim 17, wherein the computer software implemented phase lock loop system comprises (a) a computer software implemented phase lock loop responsive to the first periodic signal and including a feedback loop; and (b) a computer software implemented programmable divider in the feedback loop of the phase lock loop.

19. The method according to claim 16 wherein the phase lock loop system comprises (a) a phase lock loop responsive to the first periodic signal and including a feedback loop; and (b) a programmable divider in the feedback loop of the phase lock loop.

20. An apparatus for guiding a vehicle having a snow plow along a roadway, the apparatus comprising:
a GPS antenna mounted to a vehicle;
a GPS receiver responsive to the GPS antenna and configured to (a) determine a first time-tagged geographical location of the GPS antenna and a second time-tagged geographical location of the GPS antenna, and (b) generate a first periodic signal having a known time of occurrence and a first frequency;
a synchronization system responsive to the GPS receiver configured to generate a second periodic signal that (a) has a known time of occurrence, (b) is synchronized to the first periodic signal and (c) has a second frequency equal to an integer multiple of the first frequency;
an imager mounted to the vehicle, wherein the imager is (a) synchronously responsive to and triggered by the second periodic signal and (b) configured to image a roadway mark to provide a triggered roadway mark image;
a computer (a) responsive to the GPS receiver and the imager and (b) configured to:
(1) determine a GPS location of the roadway mark using positional interpolation based on the first time-tagged geographical location and the second time-tagged geographical location, and
(2) determine a continuous smooth geographical location function best-fitted to the GPS location of the roadway mark; and
a system responsive to the computer for positioning the snow plow based on the continuous smooth geographical location function.

21. The method according to claim 3, wherein the first roadway mark is located to the left of a direction of travel of the vehicle, further comprising:
imaging a second roadway mark located to the right of the direction of travel of the vehicle using a second imager mounted to the vehicle to produce a second triggered roadway mark image, wherein the second imager is synchronously responsive to and triggered by the second periodic signal; and
using a computer to determine a GPS location of the second triggered roadway mark using positional interpolation based on the first time-tagged geographical location and the second time-tagged geographical location.

22. The apparatus according to claim 1, wherein the first roadway mark is located to the left of a direction of travel of the vehicle; the apparatus further comprising a second imager mounted on the vehicle and aligned to image a second roadway mark to the right of the direction of travel of the vehicle,
wherein the second imager is (a) synchronously responsive to and triggered by the second periodic signal and (b) configured to image the second roadway mark to provide a second triggered roadway image, and
the computer is (a) further responsive to the second imagers and the GPS receiver and (b) configured to determine a GPS location of the second roadway mark using positional interpolation based on the first time-tagged geographical location, the second time-tagged geographical location, and the second triggered roadway mark image.

23. The method according to claim 3, wherein the first imager is mounted to the vehicle using an adjustable mount including a fixably adjustable axis of rotation parallel to the roadway surface for aligning the first imager so that the first imager can focus on the roadway mark.

24. The method according to claim 3, further comprising the GPS antenna receiving GPS radio-wave signals originating from a GPS satellite system or a GPS-pseudolite array, wherein determining the first time-tagged geographical location and the second time-tagged geographical location comprises the GPS receiver receiving the GPS radio-wave signals from the GPS antenna and decoding the GPS radio-wave signals.

25. An apparatus for locating and placing marks on a roadway, the apparatus comprising:
a GPS antenna mounted to a vehicle;
a GPS receiver responsive to the GPS antenna and configured to (a) determine a first time-tagged geographical location of the GPS antenna and a second time-tagged geographical location of the GPS antenna, and (b) generate a first periodic signal having a known time of occurrence and a first frequency;
a synchronization system responsive to the GPS receiver configured to generate a second periodic signal that (a) has a known time of occurrence, (b) is synchronized to the first periodic signal and (c) has a second frequency equal to an integer multiple of the first frequency;
an imager mounted to the vehicle, wherein the imager is (a) synchronously responsive to and triggered by the second periodic signal and (b) configured to image a roadway mark to provide a triggered roadway mark image; and
a computer (a) responsive to the GPS receiver and the imager, and (b) configured to:
(1) determine a GPS location of the roadway mark using positional interpolation based on the first time-tagged geographical location, the second time-tagged geographical location, and the first triggered roadway mark image and
(2) determine a continuous smooth geographical location function best-fitted to the GPS location of the roadway mark; and
a nozzle array and control system responsive to the computer for replicating automatically the roadway mark at a location defined by the continuous smooth geographical location function by placing a marking material on the roadway.

26. The apparatus according to claim 24, wherein the GPS radio-wave signals comprise a real time kinematic correction signal.

27. The method according to claim 8, wherein the roadway mark characteristics include at least one of a width of the first roadway mark, a length of the first roadway mark, a grayscale reflectivity, retroreflectivity, and a fill percentage.

28. The apparatus according to claim 2, wherein the GPS radio wave signals comprise a real time kinematic correction signal.

29. The apparatus according to claim 1, wherein the computer is configured to determine the GPS location of the first triggered roadway mark using positional interpolation based on the first time-tagged geographical location, the second time-tagged geographical location, and the known time of occurrence of the second signal.

30. An apparatus for determining a continuous smooth geographical location function of a roadway mark comprising:

a GPS antenna mounted to a vehicle;

a GPS receiver responsive to the GPS antenna and configured to (a) determine a first time-tagged geographical location of the GPS antenna and a second time-tagged geographical location of the GPS antenna, and (b) generate a first periodic signal having a known time of occurrence and a first frequency;

a synchronization system responsive to the GPS receiver configured to generate a second periodic signal that (a) has a known time of occurrence, (b) is synchronized to the first periodic signal and (c) has a second frequency equal to an integer multiple of the first frequency;

an imager mounted to the vehicle, wherein the imager is (a) synchronously responsive to and triggered by the second periodic signal and (b) configured to image a roadway mark to provide a triggered roadway mark image; and a computer (a) responsive to the GPS receiver and the imager, and (b) configured to:

(1) determine a GPS location of the roadway mark from the triggered roadway mark image and the geographical location of the GPS antenna, and (b) calculate a smooth continuous geographical location function from the GPS location of the roadway mark.

31. The apparatus according to claim 30, wherein the smooth continuous geographical location function is a best-fitted continuous geographical location function.

32. The apparatus according to claim 1, wherein the synchronization system comprises a phase lock loop system.

33. The apparatus according to claim 32, wherein the phase lock loop system comprises (a) a phase lock loop responsive to the first periodic signal and including a feedback loop; and (b) a programmable divider in the feedback loop of the phase lock loop.

34. The apparatus according to claim 32, wherein the phase lock loop system comprises a computer software implemented phase lock loop system.

35. The apparatus according to claim 34, wherein the computer software implemented phase lock loop system comprises (a) a computer software implemented phase lock loop responsive to the first periodic signal and including a feedback loop; and (b) a computer software implemented programmable divider in the feedback loop of the phase lock loop.

36. The apparatus according to claim 1, wherein the first imager is a calibrated imager.

37. The apparatus according to claim 1, wherein the first imager is a charge coupled device camera.

* * * * *